(12) United States Patent
Gumpoltsberger et al.

(10) Patent No.: US 7,225,695 B2
(45) Date of Patent: Jun. 5, 2007

(54) UNIVERSALLY CONFIGURABLE MOTOR VEHICLE TRANSMISSION

(75) Inventors: Gerhard Gumpoltsberger, Friedrichshafen (DE); Michael Ebenhoch, Friedrichshafen (DE); Bernd Vahlensieck, Oberteuringen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 40 days.

(21) Appl. No.: 10/705,029

(22) Filed: Nov. 10, 2003

(65) Prior Publication Data

US 2004/0093972 A1 May 20, 2004

(30) Foreign Application Priority Data

Nov. 15, 2002 (DE) ................. 102 53 259

(51) Int. Cl.
*F16H 3/08* (2006.01)
(52) U.S. Cl. .............................. 74/325; 74/329; 74/330
(58) Field of Classification Search .......... 74/325–333
See application file for complete search history.

(56) References Cited

U.S. PATENT DOCUMENTS

| | | | |
|---|---|---|---|
| 3,354,745 A | 11/1967 | De Castelet | 74/665 |
| 4,041,807 A | 8/1977 | Herr | 74/752 C |
| 4,464,945 A | 8/1984 | Ertl | 74/15.6 |
| 5,107,951 A | 4/1992 | Kawamura | 180/248 |
| 5,178,039 A | 1/1993 | Shirley et al. | 74/606 R |
| 5,916,054 A * | 6/1999 | Kobayashi | 475/220 |
| 6,209,407 B1 | 4/2001 | Heinzel et al. | 74/331 |
| 6,250,171 B1 | 6/2001 | Sperber et al. | 74/331 |
| 6,314,827 B1 | 11/2001 | Matsufuji | 74/325 |
| 6,544,142 B2 * | 4/2003 | Kobayashi | 477/54 |
| 6,591,705 B1 * | 7/2003 | Reik et al. | 74/343 |
| 6,648,795 B2 * | 11/2003 | Kobayashi | 477/54 |
| 6,655,226 B2 * | 12/2003 | Oguri | 74/333 |
| 6,793,604 B2 * | 9/2004 | Kobayashi | 475/220 |
| 2002/0124686 A1 * | 9/2002 | Ohtani et al. | 74/665 F |

FOREIGN PATENT DOCUMENTS

| | | |
|---|---|---|
| DE | 1 955 769 | 2/1967 |
| DE | 75 20 252 | 5/1976 |
| DE | 14 55 885 | 12/1976 |
| DE | 30 06 811 A1 | 10/1981 |
| DE | 34 18 557 A1 | 11/1985 |

(Continued)

*Primary Examiner*—Tisha Lewis
(74) *Attorney, Agent, or Firm*—Davis Bujold & Daniels, P.L.L.C.

(57) ABSTRACT

A motor vehicle transmission (1) which is outfitted with a start-up subassembly (A), a core transmission (B) as well as an output subassembly (C) which are drive-engineering connected with one another and are arranged in a transmission housing to reduce development, manufacturing and storage costs. Moreover, the start-up subassembly (A) contains a clutch, a double clutch (5) or a torque converter, while the core transmission (B) is constructed as a gear reduction transmission. The core transmission (B) disposes over at least one transmission input shaft (6, 7), a gear reduction shaft (19) as well as at least one transmission output which is not oriented coaxially toward the at least one transmission input shaft (6, 7). The output subassembly (C) contains transmission components for a front-transverse drive (41, 42, 43), for a front-longitudinal or rear-longitudinal drive (39) or for an all wheel drive (44, 45, 46, 47, 49, 50, 51, 52, 53, 55, 56).

30 Claims, 23 Drawing Sheets

FOREIGN PATENT DOCUMENTS

| | | |
|---|---|---|
| DE | 37 10 582 A1 | 11/1987 |
| DE | 37 15 880 A1 | 5/1988 |
| DE | 44 01 812 A1 | 8/1994 |
| DE | 44 36 526 A1 | 10/1995 |
| DE | 196 30 155 A1 | 1/1998 |
| DE | 198 21 164 A1 | 11/1999 |
| DE | 198 50 546 C1 | 5/2000 |
| DE | 198 60 251 C1 | 11/2000 |
| DE | 199 23 185 A1 | 12/2000 |
| DE | 102 31 547 | 7/2002 |
| DE | 202 12 094 U1 | 11/2002 |

* cited by examiner

UNIVERSALLY CONFIGURABLE MOTOR VEHICLE TRANSMISSION

This application claims priority from German Application Serial No. 102 53 259.1 field Nov. 15. 2002.

FIELD OF THE INVENTION

The invention concerns a motor vehicle transmission that is constructed as a back gear transmission.

BACKGROUND OF THE INVENTION

Motor vehicle transmissions of this type are described, for example, in DE 198 21 164 A1, DE 198 60 251 A1 and DE 199 23 185 A1. Moreover, it is known that automatic transmissions and manual transmissions differ sharply in their internal construction so that in each case different transmission components are necessary to be able to manufacture different transmissions of this type. In addition to this, automatic and manual transmissions are to be adapted construction-wise to the respective type of power train as well as to construction space conditions in concrete motor vehicle types.

These marginal conditions lead to the necessity of producing a type of transmission, for example for a motor vehicle having rear drive and having a motor and transmission that are arranged parallel to the direction of drive, independent of the differentiation between automatic and manual transmission, that is different from a transmission for a motor vehicle having an identical motor-transmission arrangement and front drive. Finally, as a rule, different all-wheel power train variants must also be considered so that the variety of different transmission types and transmission variants is very large.

The large number described leads to a desire to use the transmission components that are used in the various transmission types and transmission variants in a manner that overlaps the transmission types and transmission variants. These endeavors have nonetheless up until now faced narrow restrictions.

The objective of the invention therefore consists in standardizing the large number of different types and variants of automatic and manual transmissions to a large extent, so as to be able to save on development, manufacturing, repair and storage costs.

SUMMARY OF THE INVENTION

Consequently, in accordance with the invention, a motor vehicle transmission is constructed as an assembly of prefabricated machine parts which is outfitted with a start-up subassembly A, a core transmission B, and an output subassembly C, which are respectively drive-engineering connected with one another and are arranged jointly in a transmission housing. The start-up group can moreover contain a clutch, a double clutch or a torque converter, while the core transmission is constructed as a back gear transmission that has available at least one transmission input shaft, a back gear shaft, and at least one transmission output which is not oriented coaxially toward the at least one transmission input shaft. With respect to the output subassembly, it is provided that this contains transmission components for a front transverse drive, for a front longitudinal drive, for a rear longitudinal drive or for an all-wheel drive.

In a preferred refinement of the invention, the start-up subassembly, the core transmission, and the output subassembly include transmission components and/or individual transmission components assembled modular-like individually according to transmission type and/or power train. Moreover, subassembly groups $A_N$, $B_N$, $C_N$ can belong to the start-up subassembly A, the core transmission B and the output subassembly C, which can be freely combined with one another so that, for example, the following subassembly combinations result: $A_1+B_3+C_2$, $A_7+B_5+C_1$ or $A_1+B_5+C_1$.

Manual transmissions, automatic gear boxes, automatic transmissions or manually shiftable or automated shiftable double clutch transmissions with two transmission input shafts can belong, for example, to the variants $B_N$ of the core transmission B.

Preferably the core transmission is constructed as a back gear transmission, in which ratchet wheels are fastened fixed against rotation on least one of the transmission shafts, and speed gears are pivoted on at least another transmission shaft, whereby the fixed gears and the idler gears, respectively stand in meshing, forming a gear wheel pair with one another. Moreover, it is provided with such reduction gearing transmissions that the idler gears can be connected by means of coupling devices to the transmission shaft allocated to them, and the coupling devices are arranged such that they are torsion-resistant and can be axially displaced.

It is provided in an especially advantageous refinement of the invention that the speed gear wheels for the various gear steps are arranged in the transmission such that, beginning from the input side of the transmission, first the fourth gear and then the sixth gear, the second gear, the reverse gear, the seventh gear, the fifth gear, the third gear and the first gear lie one behind the other in the transmission.

It is of particular advantage if the speed gear wheels of the fourth gear, the sixth gear, the second gear and the reverse gear are arranged one behind the other on the first transmission input shaft beginning from the transmission input side, while on the second transmission input shaft, the speed gear wheels of the seventh gear, the fifth gear, the third gear and the first gear are positioned one behind the other.

The first or the second transmission input shaft is constructed as a hollow shaft in which the respectively other transmission input shaft is mounted, in order to be able to construct the transmission very compactly. Moreover, the two transmission input shafts are connected on the input side, respectively with the clutch components of a double clutch allocated to them. With the other representations, one proceeds from the assumption that the first transmission input shaft is constructed as a hollow shaft in which the second transmission input shaft is mounted.

A further aspect in the construction of the core transmission concerns the arrangement of the loose and fixed gears on the two transmission input shafts. Hence it is preferably provided that two idler gears and two fixed gears are arranged on the first transmission input shaft, while the second transmission input shaft bears exclusively fixed gears.

In addition, the gear wheels are constructed on the transmission output shaft such that, viewed from the input side of the transmission, two fixed gears are arranged before six idler gears.

A coupling device is arranged on the transmission input shaft and the transmission output shaft between two idler gears each, in order to actuate a concrete gear step; said coupling devices are preferably constructed as clutch sleeves. These coupling devices can be slid axially on the respective transmission shaft by means of adjusting devices, wherein these adjusting devices can be actuated by hand via a manual transmission or by automated or automatic transmissions using hydraulic or pneumatic adjusting apparatus such as piston-cylinder arrangements.

To actuate the coupling devices using a manual double clutch transmission constructed in accordance with the invention, for example the manual shifting device known from the not previously published German patent application DE 102 31 547 can be used with advantage.

With respect to the orientation of the transmission shafts in a transmission housing of a motor vehicle transmission constructed in accordance with the invention, it is preferably provided that the transmission output shaft is arranged beneath the two transmission input shafts with respect to its installation site inside a motor vehicle. Nonetheless, installation variants are also conceivable for which it is advantageous if the transmission output shaft is arranged above or beside a transmission input shaft.

In an all-wheel drive version of a transmission constructed in accordance with the invention, the transmission output shaft can be connected to a drive shaft (Cardan shaft) that leads to a rear axle drive, so that a part of the drive output generated by the drive motor can be transmitted to the rear wheels, while the other part is conducted to the front wheels.

In order now to construct a motor vehicle transmission in longitudinal construction for a pure motor vehicle front wheel drive using the core transmission, the transmission output shaft is preferably connected to an auxiliary shaft on its end that is directed toward the transmission input, with said auxiliary shaft bearing a fixed gear that stands in mesh with a spur bevel wheel of a front axle differential transmission.

In another refinement of the invention, the core transmission is outfitted with transmission components for an all-wheel drive for front-longitudinal configurations, in which the drive output for the front axle and the rear axle of the motor vehicle are issued from the side of the transmission that lies on the opposite end of the transmission input.

For this purpose, a fixed gear is arranged at the end of the transmission output shaft that points away from the transmission input, or on a first auxiliary shaft that is fastened there, wherein said fixed gear meshes with a fixed gear on a second auxiliary shaft that is constructed as a hollow shaft or has a hollow shaft segment, and is coaxially installed on the second transmission input shaft of the core transmission.

Moreover, it is provided that this second auxiliary shaft is connectable with a drive shaft that leads to a rear axle drive, and that the fixed gear stands in mesh with a further fixed gear on the transmission output shaft or the first auxiliary shaft, which fixed gear is arranged on a side shaft leading to a front axle differential transmission.

This side shaft can moreover be oriented obliquely or axially parallel toward the transmission output shaft and/or the transmission input shafts, wherein when the side shaft is obliquely oriented in the input region of the transmission, [it] can be accommodated for the front axle differential transmission, and the side shaft bears a fixed gear that meshes with a spur bevel gear of the front axle differential transmission.

In one variant of the previously described all-wheel drive, the second auxiliary shaft on the second transmission input shaft can also be dispensed with, so that an all-wheel power train with axle offset for front and rear longitudinal configurations can be constructed. For this, a fixed gear is arranged on the transmission output shaft or on an auxiliary shaft fastened to it, which fixed gear stands in mesh with a gear wheel, which, with the front axle drive module described, is fastened on a side shaft positioned obliquely or axially parallel leading to a front axle differential transmission and to the transmission output shaft and/or the transmission input shafts, whereby a drive shaft with axle offset relative to the transmission input shafts that lead to a rear axle transmission can be fastened on the transmission output shaft or on the auxiliary shaft.

In another variant of the invention, the core transmission is used for the construction of an all-wheel transmission with integrated longitudinal distribution transmission for motor vehicles having front and rear longitudinal configurations. For this purpose, the transmission output shaft drives the input side of a longitudinal distributor transmission with its end that points away from the input side of the transmission, wherein the output shaft of said longitudinal distributor transmission bears a fixed gear that meshes with a fixed gear on an auxiliary shaft of the rear axle drive module that is designed as a hollow shaft or has a hollow shaft segment. This auxiliary shaft is coaxially mounted on the second transmission input shaft and is connectable with a drive shaft that leads to a rear axle transmission.

In addition to this, the second output of the longitudinal distributor transmission disposes of a gearing, preferably an external gearing, which meshes with a fixed gear on a side shaft of the front axle drive module, which, as was already described with the preceding variant, leads to a front axle differential transmission and is obliquely oriented or is oriented parallel to the axle toward the transmission output shaft and/or the transmission input shafts. Moreover, a fixed gear is fastened on the obliquely arranged side shaft and meshes with the spur bevel gear of the front axle differential transmission.

In a further variant of the invention, it can be provided that the transmission output shaft drives a longitudinal distributor transmission with its end that points away from the transmission input shaft, with the output shaft of the longitudinal distributor transmission being connectable with a drive shaft that leads to a rear axle transmission.

The second output of this longitudinal distributor transmission moreover has available an external gearing, which meshes with a fixed gear on a side shaft of the front axle drive module described, which leads to a front axle differential transmission and is oriented obliquely or axially parallel toward the transmission output shaft and/or the transmission input shafts.

The longitudinal distributor transmissions mentioned are preferably constructed as Torsen differential transmissions.

Instead of a longitudinal distributor transmission, a core transmission of the invention can also be outfitted with a longitudinal distributor clutch in order then to create a comparatively economical motor vehicle transmission for all-wheel drive with drive units arranged up front longitudinally in the vehicle.

For this, it is provided that a first auxiliary shaft is fastened coaxially on the end of the transmission output shaft that faces away from the transmission input side of the core transmission, which auxiliary shaft is connected with the input side of a longitudinal distributor clutch. In addition, a fixed gear is arranged on this first auxiliary shaft, which meshes with a further fixed gear that is arranged torsion-resistant on a second auxiliary shaft.

This second auxiliary shaft is a component of the already described rear axle drive module and is preferably constructed as a hollow shaft or at least has a hollow shaft segment with which this is mounted on the second transmission input shaft. The second auxiliary shaft can moreover be connected with a drive shaft that leads to a rear axle transmission, thus to a Cardan shaft, on its side that points away from the input side of the core transmission.

In order to forward a drive torque to the front wheels of the motor vehicle, the output side of the longitudinal distributor clutch is connected to a gear wheel that is arranged on the first auxiliary shaft such that it can rotate, or bears an external gearing that meshes with a fixed gear on a side shaft of the already described front axle drive module. This side shaft leads to a front axle differential transmission and is oriented obliquely or axially parallel to the first transmission output shaft and/or the transmission input shafts. With an oblique arrangement of the side shaft, the front axle differential transmission can be incorporated into the overall transmission.

To realize an all-wheel variant with an integral longitudinal distributor clutch and an axle offset between the two transmission input shafts and the drive shaft that leads to the rear wheels, it can be provided that the transmission output shaft is coaxially connected to an auxiliary shaft, which stands in connection with the input side of a longitudinal distributor clutch.

The first output of this longitudinal distributor clutch is connectable with the drive shaft that leads to a rear axle transmission, while its second output is drive-engineering coupled with a gear wheel pivoted on this auxiliary shaft, or has an external gearing that stands in mesh with a fixed gear on a side shaft of the front axle drive module. This side shaft leads to a front axle differential transmission of the all-wheel power train, and is oriented obliquely or axially parallel to the first transmission output shaft and/or the transmission input shafts.

In order to construct an all-wheel power train with a motor vehicle transmission in which both the front wheel drive and the rear wheel drive of the motor vehicle can be decoupled from the core transmission when necessary, a first auxiliary shaft is fastened coaxially on the core transmission on the side of the transmission output shaft that points away from the input side, the other end of which is connected with the input side of a first longitudinal distributor clutch.

The output side of this first longitudinal distributor clutch has an external gearing or stands in connection with a gear wheel that is pivoted on the transmission output shaft and meshes with a fixed gear on a side shaft of the already described front axle drive module. As with the other variants described, this side shaft leads to a front axle differential transmission, and is oriented obliquely or axially parallel to the transmission output shaft and/or the transmission input shafts.

Moreover a second gear wheel is fastened on this first auxiliary shaft and meshes with a fixed gear that is arranged on a second auxiliary shaft. This second auxiliary shaft is constructed as a hollow shaft or has at least one hollow shaft segment with which this second auxiliary shaft is coaxially mounted on the second transmission input shaft. Finally, the end of the second auxiliary shaft that points away from the transmission input side stands in connection with the input side of a second longitudinal distributor clutch, whose output side can be drive-engineering coupled with a drive shaft that leads to a rear axle transmission.

In a variant of the previously described motor vehicle transmission having two longitudinal distributor clutches, it can be provided that the power train has an axle offset between the two transmission input shafts and the drive shaft that leads to the rear axle.

For this, the transmission output shaft is coaxially connected at its end that points away from the transmission input side to a first auxiliary shaft, the other end of which stands in connection with the input side of a first longitudinal distributor clutch. The output side of this first longitudinal distributor clutch is consequently connectable with a drive shaft that leads to a rear axle transmission.

In addition to this, a fixed gear is fastened to the first auxiliary shaft and stands in mesh with a fixed gear on a second auxiliary shaft. This second auxiliary shaft for its part is connected to the input side of a second longitudinal distributor clutch. The output side of this second longitudinal distributor clutch now stands in connection with a side shaft that leads to a front axle differential transmission and is oriented obliquely or axially parallel to the first transmission output shaft and/or to the two transmission input shafts.

In another variant of the invention, the core transmission is outfitted with two longitudinal distributor clutches arranged axially one behind the other, and is provided with an axle offset, which is better suited for other construction space conditions in other motor vehicle types than the previously sketched power train structures. Accordingly, the core transmission is coaxially connected to an auxiliary shaft on the end of the transmission output shaft that points away from the transmission input, on whose end that points away from the transmission output shaft the input sides of the first and second longitudinal distributor clutch are fastened.

The output side of the second longitudinal distributor clutch can be connected to a drive shaft that leads to a rear axle transmission, while the output side of the first longitudinal distributor clutch is connected to a gear wheel that is mounted on the auxiliary shaft or bears an external gearing that stands in mesh with a fixed gear on a side shaft of the already described front axle drive module that leads to a front axle differential transmission. This side shaft can be oriented obliquely or axially parallel to the first transmission output shaft and/or to the two transmission input shafts.

Moreover, a motor vehicle transmission without axle offset between the transmission input shafts and the drive shaft leading to the rear axle be constructed by a first auxiliary shaft being coaxially fastened on the side of the transmission output shaft that points away from the input side of the core transmission, with said auxiliary shaft standing in propulsive connection with the input side of a first longitudinal distributor clutch.

The output side of this first longitudinal distributor clutch has an external gearing or is connected with a gear wheel that is mounted on the transmission output shaft and meshes with a fixed gear that is fastened on a side shaft of the already described front axle drive module that leads to a front axle differential transmission. This side shaft can be arranged obliquely or axially parallel to the transmission output shaft and/or the transmission input shafts.

In addition to this, a fixed gear is arranged on the first auxiliary shaft and meshes with an external gearing on the input side of a second longitudinal distributor clutch or stands in mesh with a gear wheel that is connected to the input side of the second longitudinal distributor clutch. This input side of the second longitudinal distributor clutch is moreover connected to a second auxiliary shaft that is constructed as a hollow shaft or has a hollow shaft segment and is mounted on the second transmission input shaft. Finally, the output side of the second longitudinal distributor clutch can be connected to a drive shaft leading to a rear axle transmission.

In another refinement of the invention, to furnish an all-wheel motor vehicle transmission having two integral longitudinal distributor clutches and an integral front axle distributor transmission, it is provided that the end of the transmission output shaft that points toward the input side of the transmission is connected to the input side of a first longitudinal distributor clutch whose output side stands in propulsive connection with a first auxiliary shaft that leads to a front axle differential transmission.

The first auxiliary shaft either leads to a separate front axle differential transmission or bears a fixed gear that meshes with the spur bevel gear of the front axle differential transmission. The end of the transmission output shaft that points away from the input side of the transmission is, in contrast, connected to the input side of a second longitudinal distributor clutch whose output side stands in propulsive connection with a second auxiliary shaft.

A gear wheel is fastened on this second auxiliary shaft that meshes with a further gear wheel, which is wedged on a third auxiliary shaft. This third auxiliary shaft is constructed as a hollow shaft or has a hollow shaft segment with which this third auxiliary shaft is coaxially mounted on the second transmission input shaft. Finally this third auxiliary shaft can be connected to a drive shaft that leads to a rear axle transmission.

For a motor vehicle transmission having two longitudinal distributor clutches and an axle offset between the transmission input side and the drive shaft leading to the rear axle, it can be provided that the end of the transmission output shaft that points toward the input side of the transmission is connected to the input side of a first longitudinal distributor clutch.

The output side of this first longitudinal distributor clutch then stands in propulsive connection with a first auxiliary shaft, which leads to a front axle differential transmission and bears a fixed gear that meshes with the spur bevel gear of the front axle differential transmission. Furthermore, it is provided that the end of the transmission output shaft that points away from the input side of the transmission is connected to the input side of a second longitudinal distributor clutch whose output side can be connected to a drive shaft that leads to a rear axle transmission.

Finally, an all-wheel drive configuration with the core transmission, in which the end of the transmission output shaft that points toward the input side of the transmission is connected to the input side of a first longitudinal distributor clutch, is possible. The output side of this first longitudinal distributor clutch is then connected to a first auxiliary shaft that leads to a separate front axle differential transmission.

The end of the transmission output shaft that points away from the input side of the transmission is moreover connected to the input side of a second longitudinal distributor clutch, whose output side can be drive engineering connected to a drive shaft that leads to a rear axle transmission.

Furthermore, for some power train and transmission variants having longitudinal distributor clutches, it can be provided that a front axle differential transmission is incorporated in the core transmission in each case.

Moreover, a reverse speed shaft preferably belongs to the core transmission, on which shaft a reverse speed gearwheel is fastened, which stands in mesh with the reverse speed fixed gear and the reverse speed idler gear on the transmission input shaft or on the transmission output shaft, for the purpose of generating a reversal of the direction of rotation and forwarding a drive torque.

Finally, it can be advantageous for reasons of costs and construction space if the transmission components to be connected to the core transmission are not arranged on separate auxiliary shafts but rather on or near the main shafts (transmission input shaft and transmission output shaft) of the core transmission.

BRIEF DESCRIPTION OF THE DRAWINGS

The invention will now be described, by way of example, with reference to the accompanying drawings in which.

DETAILED DESCRIPTION OF THE INVENTION

Figure 1:
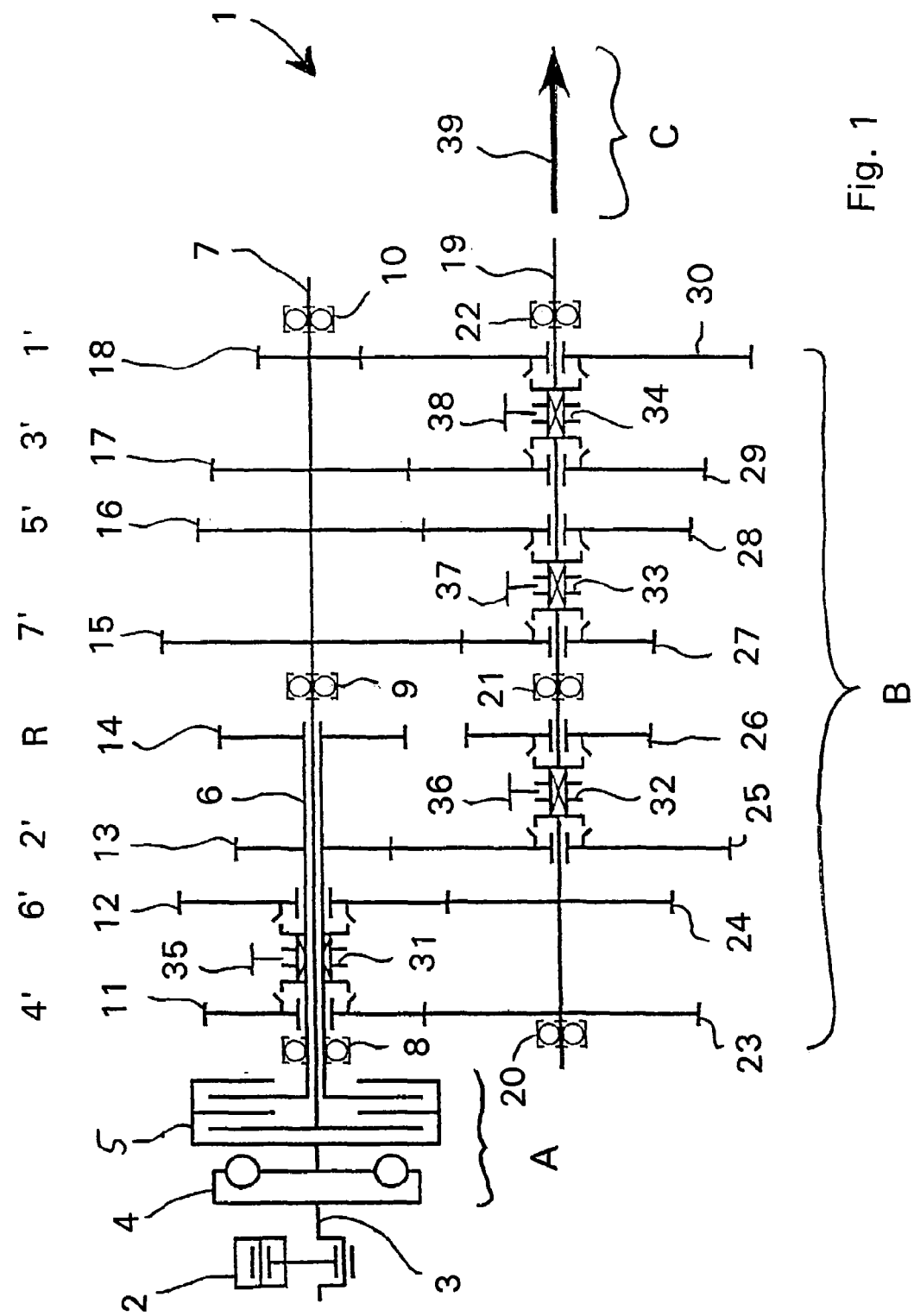
FIG. 1 illustrates a schematic representation of a double clutch core transmission for the front longitudinal incorporation in a motor vehicle with rear drive.

As FIG. 1 shows, a transmission according to the invention basically consists of three main components to which a start-up subassembly A, a core transmission B and an output subassembly C belong. With a power train 1 represented, by way of example in this Figure, a drive motor 2 and the transmission for driving the rear wheels are oriented longitudinally in the direction of travel of the motor vehicle. The motor 2 is connected via its crankshaft 3, to the input side of the start-up subassembly A, which in this embodiment has a torsional vibration damper 4. The output side of this torsional vibration damper 4 then stands in drive-engineering connection with the input side of a start-up and/or shifting clutch that is constructed as a double clutch 5.

The two output sides of the double clutch 5 are connected via a first transmission input shaft 6 and a second transmission input shaft 7 to the double clutch core transmission B, wherein the first transmission input shaft 6 is constructed as a hollow shaft which bears the second transmission input shaft 7 coaxially. Moreover, the two transmission input shafts 6, 7 are installed in bearings housing that is not represented here.

In this exemplary embodiment, a total of four speed gear wheels are arranged on the first transmission input shaft 6 in this embodiment, of which two gear wheels 11, 12 near the transmission input are constructed as idler gears, which are mounted axially, unmovable or rotatably, on this first transmission input shaft 6. Two other gear wheels 13, 14 are constructed as fixed gears and are connected torsion resistant to the first transmission input shaft 6.

The two idler gears 11, 12 can be connected torsion-resistant, alternatively to one another, to the first transmission input shaft 6, via a sliding sleeve 31, that is arranged torsion-resistant, but axially displaceable on this first transmission input shaft 6. For actuating the sliding sleeve 31, an actuation device 35 is present which can be manually displaced by the driver of the motor vehicle using a manual shift version of the transmission, via a rod, that is not represented here, while with an automated or automatic motor vehicle transmission of identical construction, this actuation of the adjusting device preferably is accomplished via piston-cylinders that also are not represented here.

The speed gear wheels on the second transmission input shaft 7 are exclusively constructed as fixed gears 15, 16, 17, 18 and fastened there.

In addition to the two transmission input shafts 6, 7, a transmission output shaft 19 as a further main transmission shaft is arranged parallel to the two input shafts 6, 7 in the transmission housing and installed by means of bearings 20, 21, 22.

The speed gear wheels arranged on the transmission output shaft 19 of this core transmission are in this case constructed such that in each case a fixed gear on the transmission output shaft 19 stands in mesh with an idler gear on one of the two transmission input shafts 6, 7, or an idler gear on the transmission output shaft 19 meshes with a fixed gear on one of the transmission input shafts 6, 7.

Thus, first two fixed gears 23, 24 are fastened on the transmission output shaft 19 near the transmission input, followed by a total of six idler gears 25, 26, 27, 28, 29, 30. Between every two idler gears 25, 26; 27, 28; 29, 30 a sliding sleeve 32, 33, 34 is arranged, torsion resistant and axially displaceable, on the transmission output shaft 19, with which the idler gears 25, 26; 27, 28; 29, 30 can be connected, alternatively to one another, torsion-resistant to the transmission input shaft 19.

Actuation devices 36, 37, 38 are also present here for actuating the sliding sleeves 32, 33, 34, which devices can be actuated manually by the driver in a manual shifting version of the transmission, while with an automated or automatic motor vehicle transmission of identical construction, the actuation of the above-mentioned adjusting devices preferably is accomplished by means of piston-cylinder arrangements not represented here.

As FIG. 1 shows, the speed gear wheels are lined up on the two transmission input shafts 6, 7 and the transmission output shaft 19 such that, proceeding from the double clutch 5 on the transmission input, the ratchet wheel pairs of the fourth gear 4', the sixth gears 6', the second gear 2', the reverse gear R, the seventh gear 7' the fifth gear 5', the third gear 3' and the first gear 1' are arranged one after the other.

Moreover, it can be inferred from FIG. 1 that the ratchet wheels 14, 26 for the reverse gear R obviously do not mesh directly with one another. Rather, a further ratchet wheel is necessary for reversing the direction of rotation, which is installed together with a reverse gear shaft in the transmission housing in an inherently known manner, and is FIG. 1 further shows that the output of the core transmission B is not arranged coaxially in relation to the two transmission input shafts 6, 7. Hence the components of an output subassembly C can be fastened on the side of the transmission output shaft 19 that points away from the transmission input side, to which components a drive shaft 39, constructed in this embodiment of the invention as a Cardan shaft, belongs. With the drive shaft 39, a drive torque is forwarded from the transmission arranged forward in the motor vehicle to a rear axle differential transmission.

Figure 2:
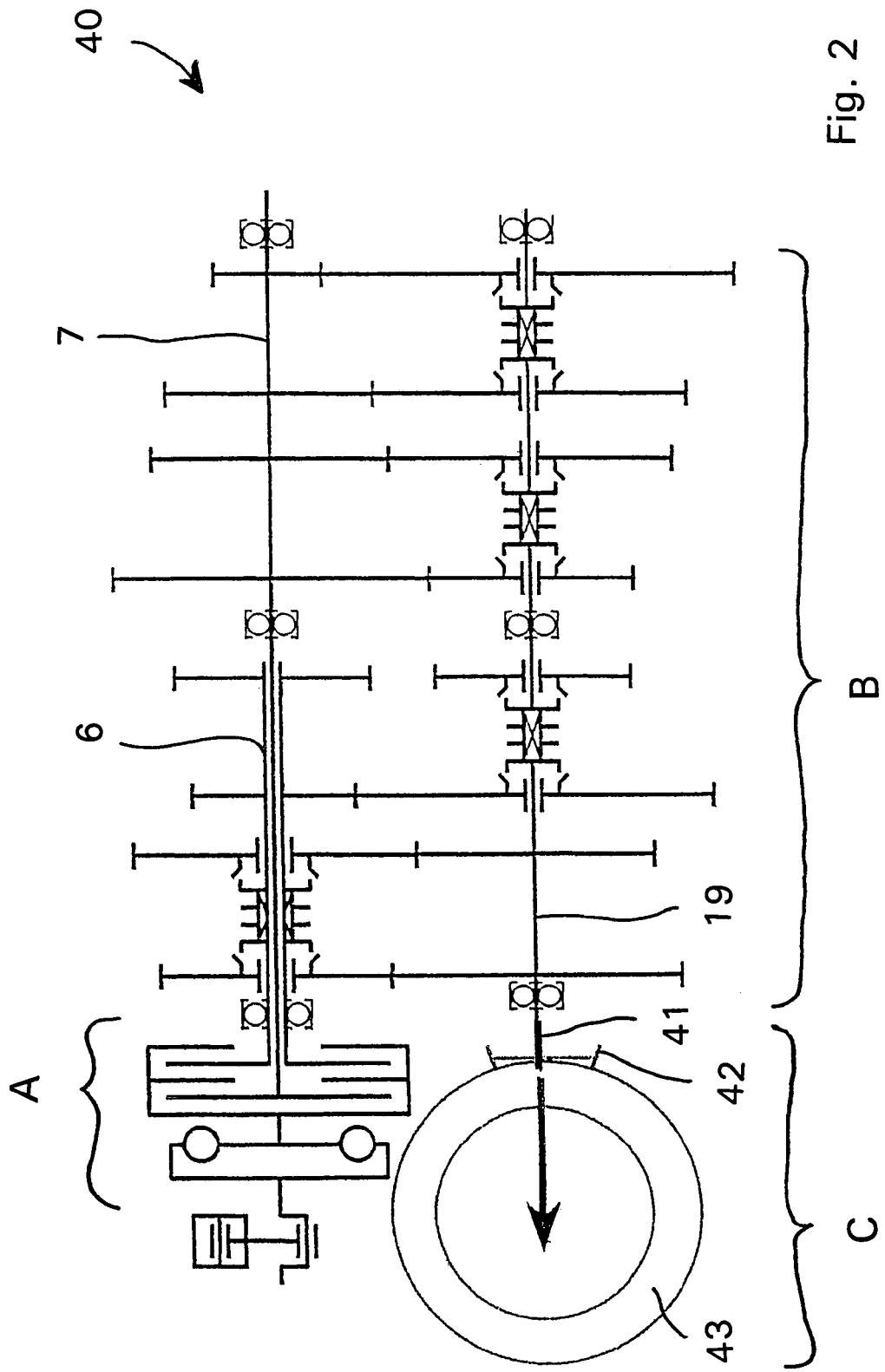
FIG. 2 illustrates a representation as in FIG. 1, but with front longitudinal drive arrangement.

As FIG. 2 shows, the double clutch core transmission A represented in FIG. 1 can be simply constructed for a motor vehicle with front drive in that an output subassembly C is fastened with an auxiliary shaft 41, on the end of the transmission output shaft 19 that points toward the transmission input side, whose fixed gear 42 meshes with a spur bevel gear 43 of a front axle differential transmission. This front axle differential transmission is moreover preferably incorporated into the transmission housing in the region of the double clutch.

In addition to the outfitting of the double clutch core transmission with transmission components for simple front or rear drive variants, the construction of the core transmission in accordance with the invention is chiefly usable with great advantage for all-wheel power trains.

Figure 3:
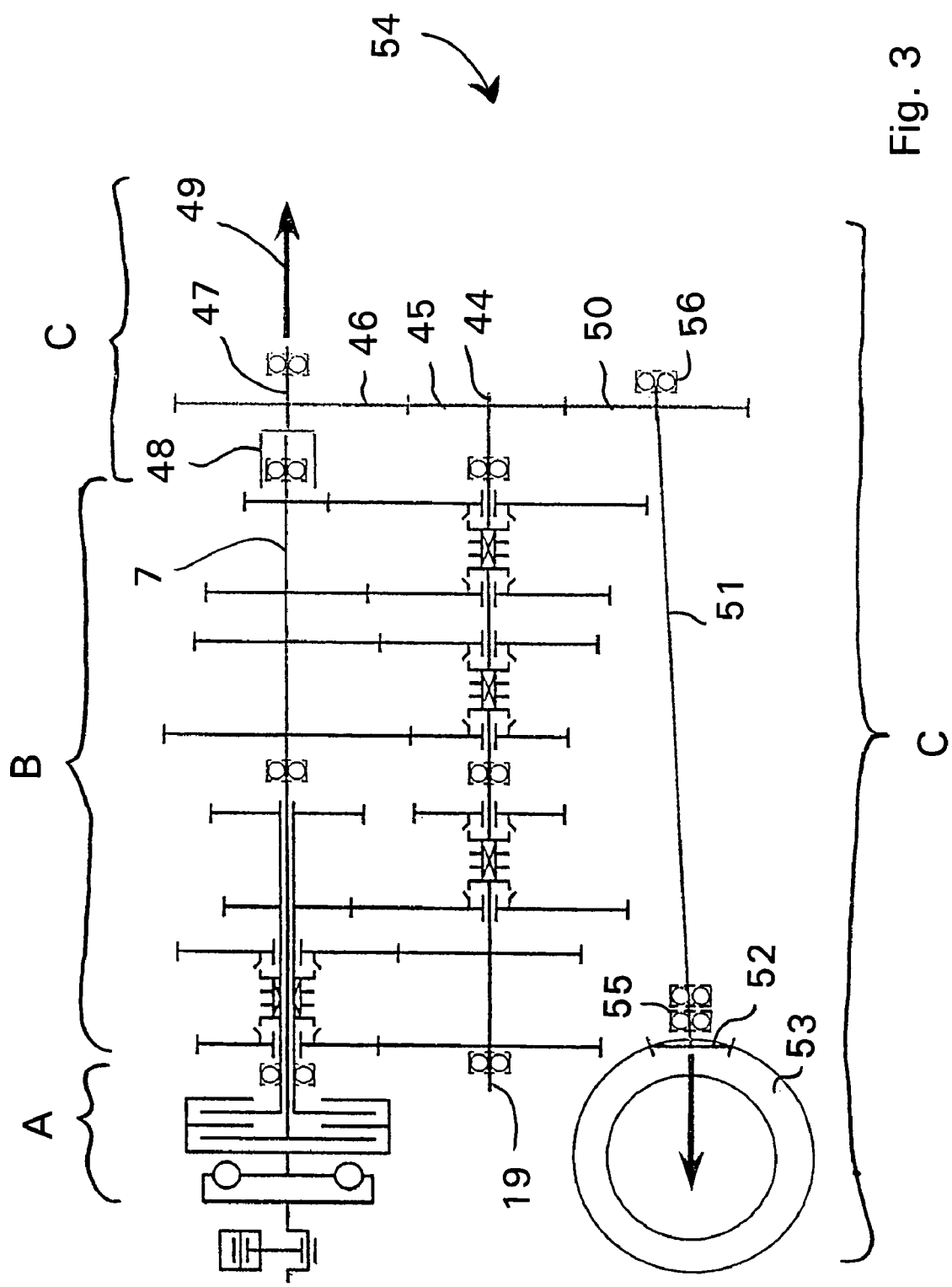
FIG. 3 illustrates a representation as in FIG. 1, but as an all-wheel transmission for a front and rear longitudinal power train with integral front axle differential transmission.

As FIG. 3 shows, with such an all-wheel power train on the motor vehicle transmission 54, the transmission output shaft 19 is connected to an output subassembly C at its end that points away from the transmission input, in which subassembly, a gear wheel 45, is fastened on a first auxiliary shaft 44. The gear wheel 45 drives a fixed gear 46 of the rear axle drive module, which is fastened on a second auxiliary shaft 47. The second auxiliary shaft 47 is constructed as a hollow shaft or has at least a hollow shaft segment 48 that is represented here, with which the auxiliary shaft 47 is pivoted on the free end of the second transmission output shaft 7.

In addition, the second auxiliary shaft 47 can be connected to a drive shaft 49, with which a drive torque is forwarded to a rear axle differential transmission (not shown).

To supply the front wheels with a drive output, the geared wheel 44 further meshes with a fixed gear 50 of a front axle drive module that belongs to the output subassembly C, which gear is fastened on a side shaft 51 that is set obliquely and mounted in bearings 55, 56. The side shaft 51 bears at its other end a fixed gear 52, which stands in mesh with a spur bevel gear 53 of a front axle differential transmission that is incorporated into the overall transmission.

Figure 4:
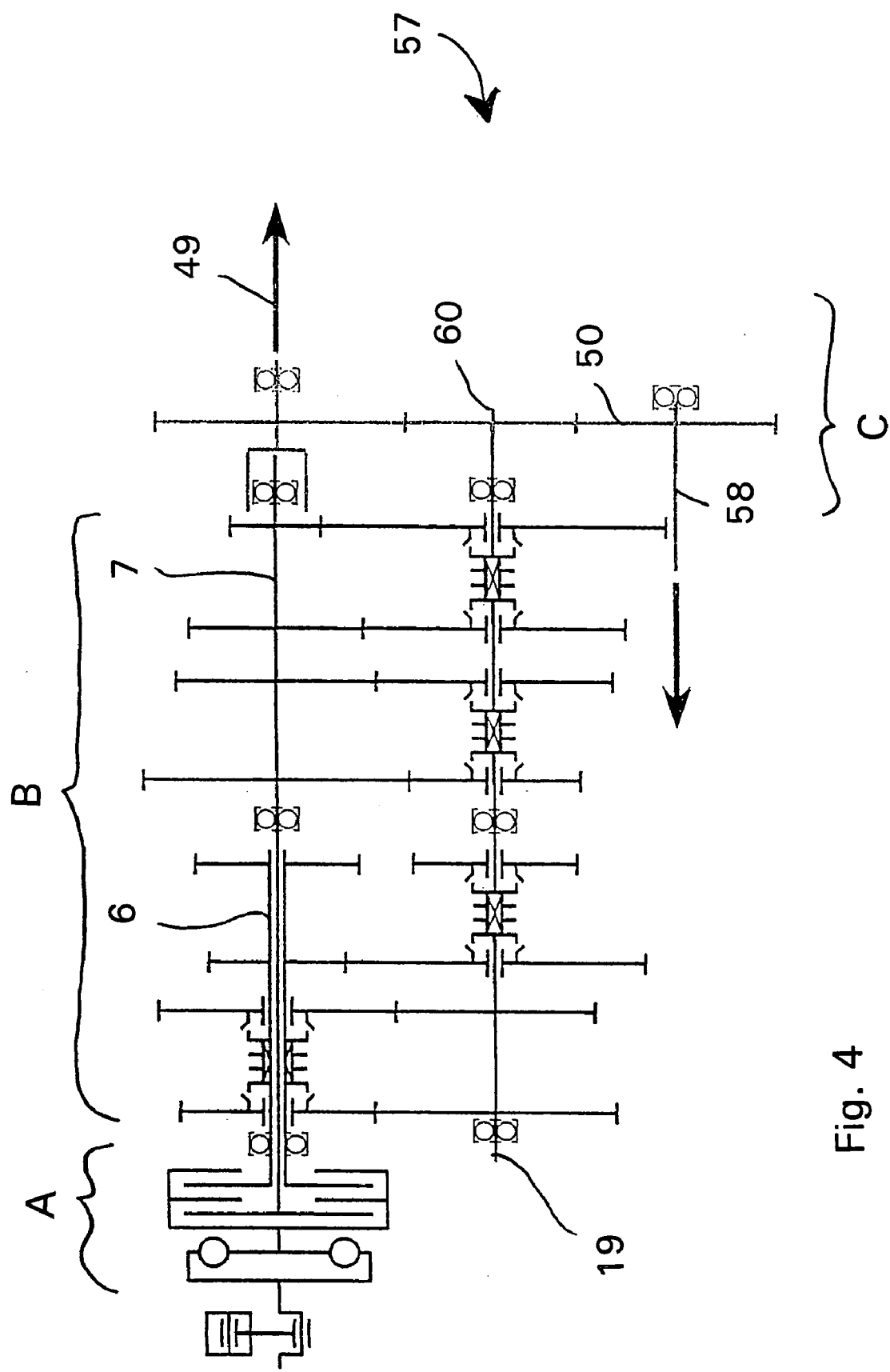
FIG. 4 illustrates a representation as in FIG. 3, but without front axle differential transmission.

In a modification of the motor vehicle transmission 54 in accordance with FIG. 3, the latter can also be outfitted with a front axle drive module, in which a side shaft 58 is arranged not obliquely, but rather axially parallel in relation to the transmission output shaft 19 and the two transmission input shafts 6, 7 (FIG. 4). The side shaft 58 leads to a separate front axle differential transmission, which is not, as with the transmission in accordance with FIG. 3, arranged in the immediate vicinity of the double clutch 5.

Figure 5:
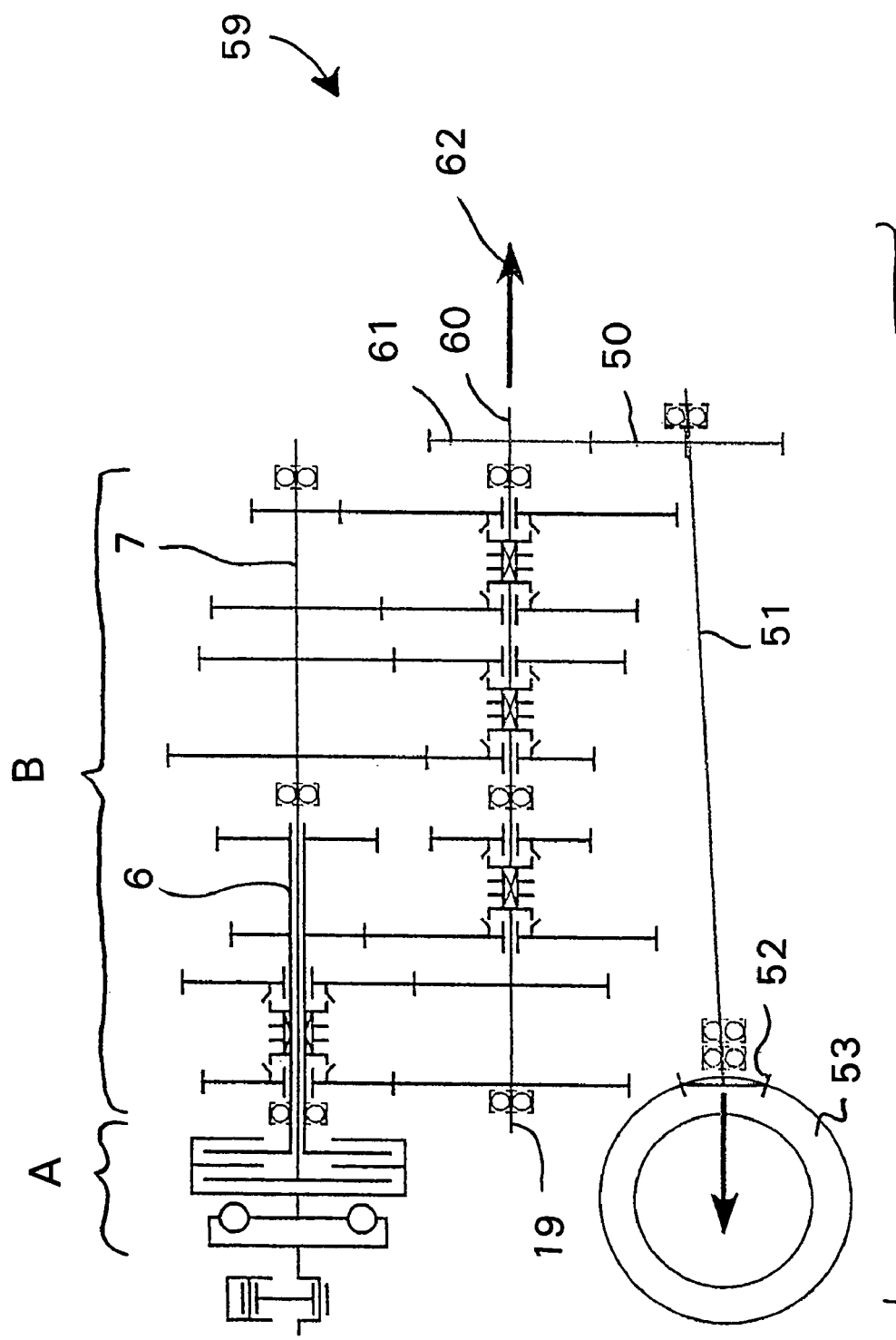
FIG. 5 illustrates an all-wheel variant with axle offset for a front and rear longitudinal power train with front axle differential transmission.

To the extent that it is desirable to position the drive shaft that leads to the rear axle differential transmission as deeply as possible, in order to avoid, for example, having to provide a Cardan tunnel in the motor vehicle body, the core transmission B can also be constructed as an all-wheel motor vehicle transmission 59 with an axle offset between the transmission input shafts 6, 7 and the Cardan shaft. As FIG. 5 shows, for this purpose an auxiliary shaft 60 of an output subassembly C is fastened coaxially on the transmission output shaft 19 of the core transmission A, which auxiliary shaft bears a fixed gear 61 that meshes with the fixed gear 50 known from the transmissions in accordance with FIG. 3 on the obliquely positioned side shaft 51 of the front axle drive module. The obliquely positioned side shaft 51 toward a front wheel differential transmission preferably incorporated in the transmission housing.

In addition to this, the auxiliary shaft 60 of the output subassembly C can be connected to a drive shaft 62 that leads to a rear axle differential transmission, so that an all-wheel motor vehicle transmission can be manufactured without great construction expense, based upon the core motor vehicle transmission.

Figure 6:
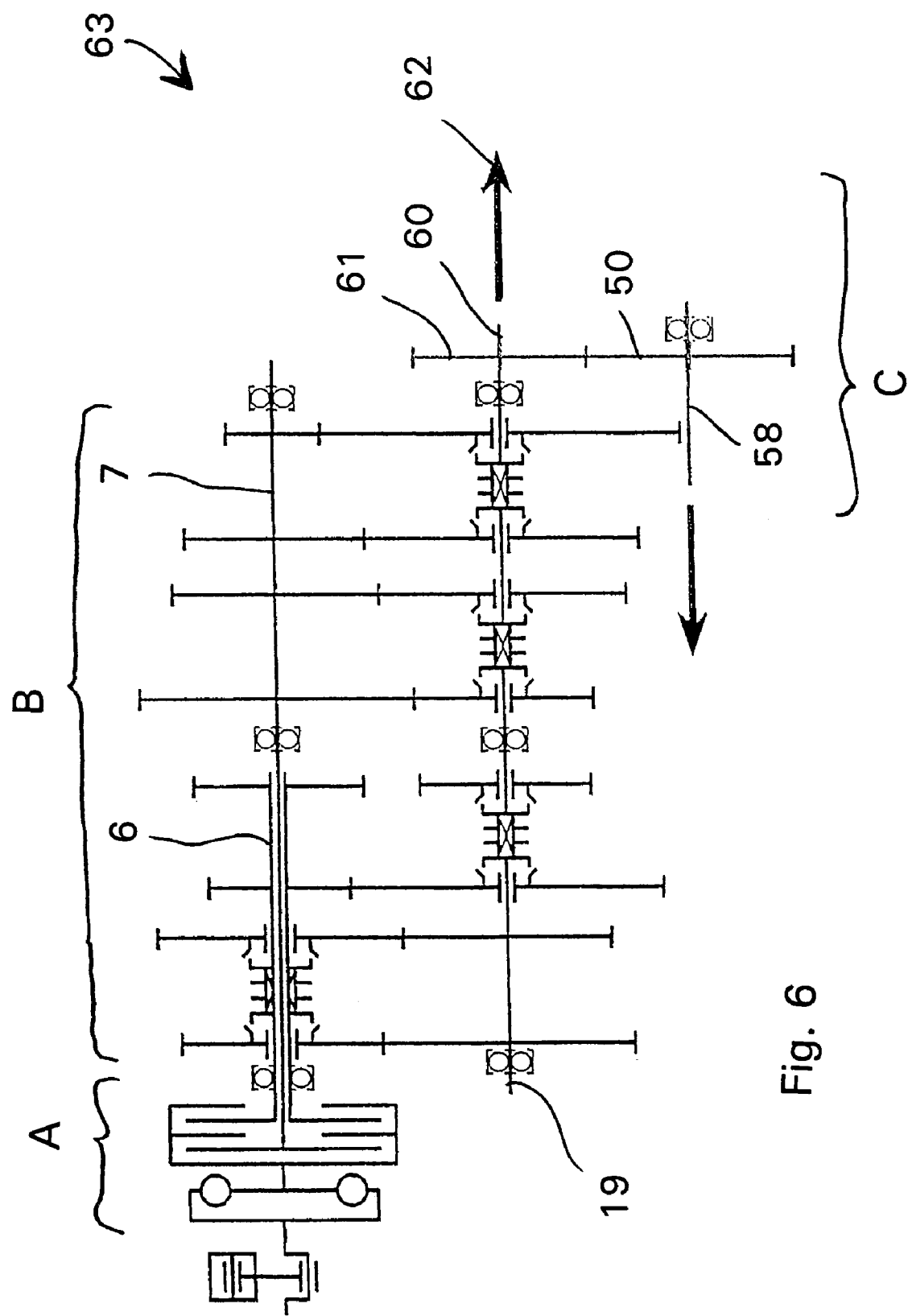
FIG. 6 illustrates a representation as in FIG. 5, but without front axle differential transmission.

FIG. 6 now shows that the transmission in accordance with FIG. 5 can also be constructed as an all-wheel drive with axle offset for front and rear longitudinal drive, in which the side shaft 58 of the output subassembly C is arranged axially parallel to the transmission output shaft 19 and to the two transmission input shafts 6, 7. The side shaft 58 leads to a front axle differential transmission, while the rear axle is driven via the drive shaft 62 by the auxiliary shaft 60 that is connected to the transmission output shaft 19.

However, the core transmission B of the invention can also be very advantageously combined with an output subassembly C, into which a longitudinal distributor transmission, for example a Torsen differential transmission, is incorporated, without changes having to be undertaken on the core transmission B.

Figure 7:
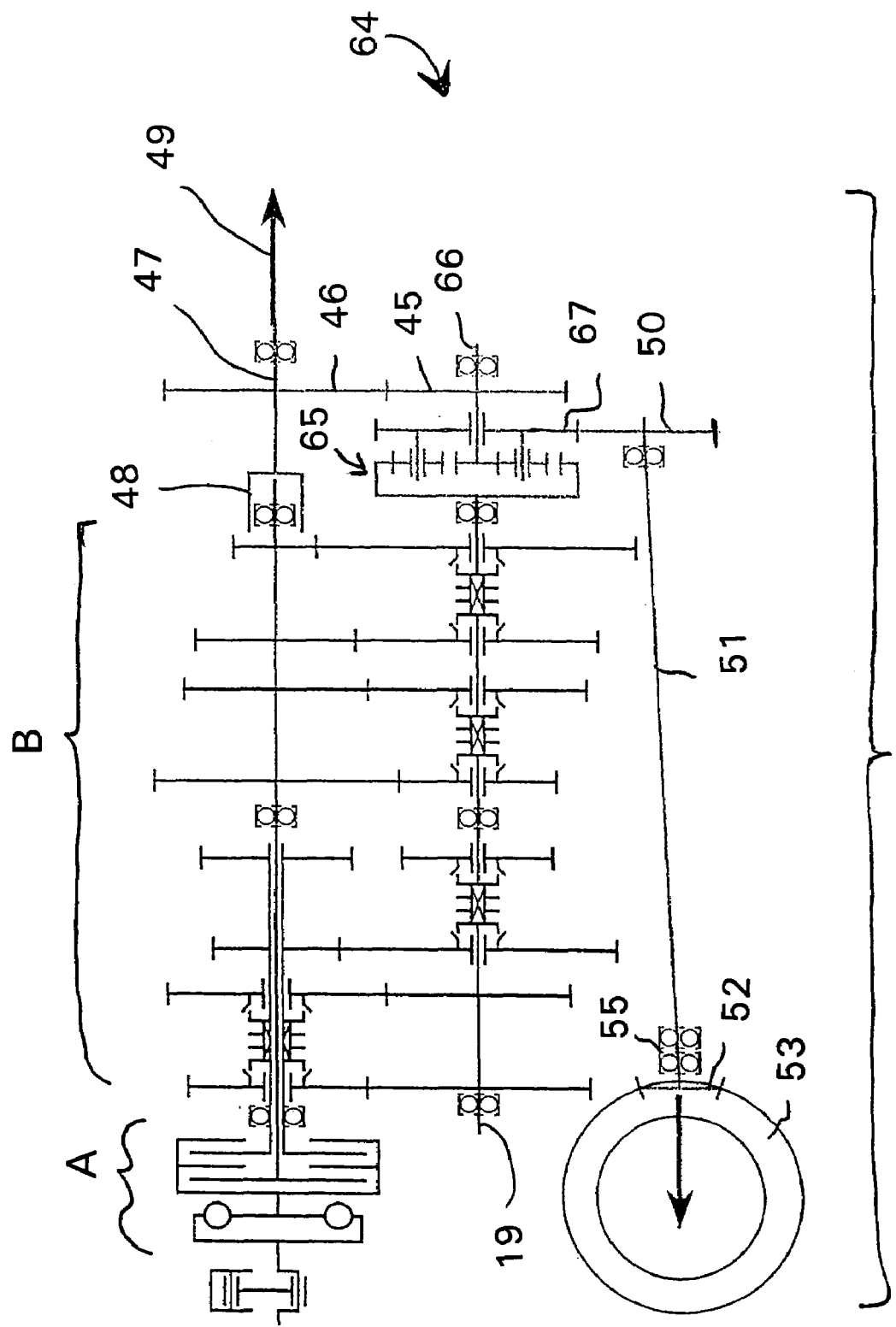
FIG. 7 illustrates an all-wheel variant with integral longitudinal distributor transmission for a front and rear longitudinal power train with front axle differential transmission.

Hence FIG. 7 shows a motor vehicle transmission 64 in which the transmission output shaft 19 of the core transmission B is drive-engineering connected to the input side of a longitudinal distributor transmission 65, which belongs to the output subassembly C. Moreover, the one output side of the longitudinal distributor transmission 65 stands in connection with a first auxiliary shaft 66 on which the gear wheel 45, known from the transmission in accordance with FIG. 3, is fastened.

The gear wheel 45 meshes with the gear wheel 46 of the already described rear axle drive module, which is fastened on the second auxiliary shaft 47, just as with the transmission in accordance with FIG. 3, wherein the auxiliary shaft 47, in this case, also has a hollow shaft segment 48, which is pivoted on the free end of the second transmission input shaft 7. In addition, the free end of the second auxiliary shaft 47 can be connected to the drive shaft 49 that leads to the rear axle transmission.

Just as with the motor vehicle transmission 64 with its longitudinal distributor transmission 65, the transmission components 46, 47, 48, 49, combined in a modular fashion, could be used for the rear axle output, the transmission components known from the transmission in accordance with FIG. 3 can also be used for the front axle drive with the transmission 64.

Hence the second output side of the longitudinal distributor transmission 65 is outfitted with an external gearing that meshes with the fixed gear 50 on the obliquely positioned side shaft 51 of the front axle drive module. The side module 51 bears, on the output side, the fixed gear 52, which stands in mesh with the spur bevel gear 53 of the front axle differential transmission that is incorporated into the transmission housing.

Figure 8:
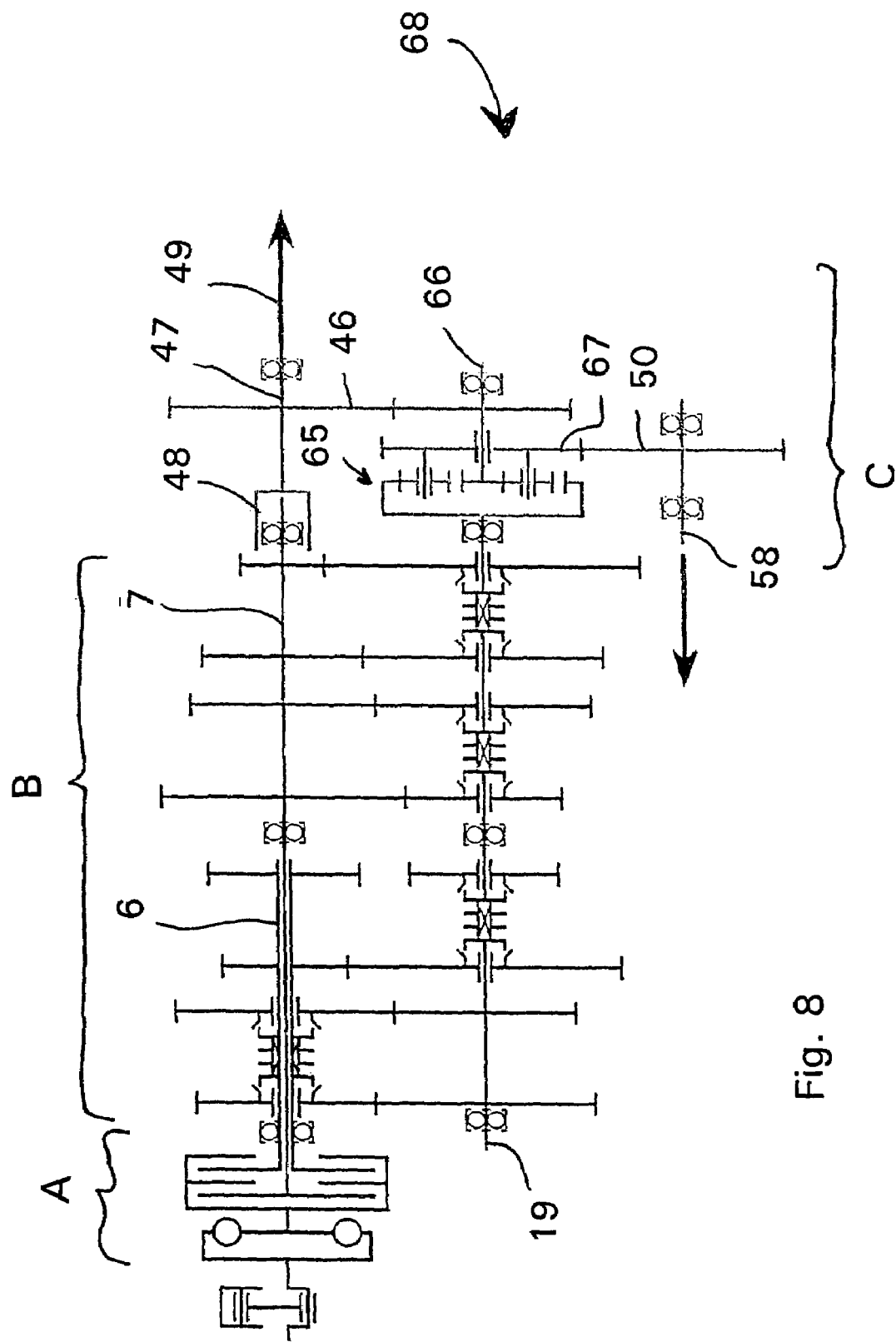
FIG. 8 illustrates a representation as in FIG. 7, but without front axle differential transmission.

As FIG. 8 shows, the motor vehicle transmission 64 in accordance with FIG. 7 can also be constructed with a front axle drive module having a side shaft 58, which is oriented parallel to the transmission output shaft 19 and the two transmission input shafts 6, 7.

Figure 9:
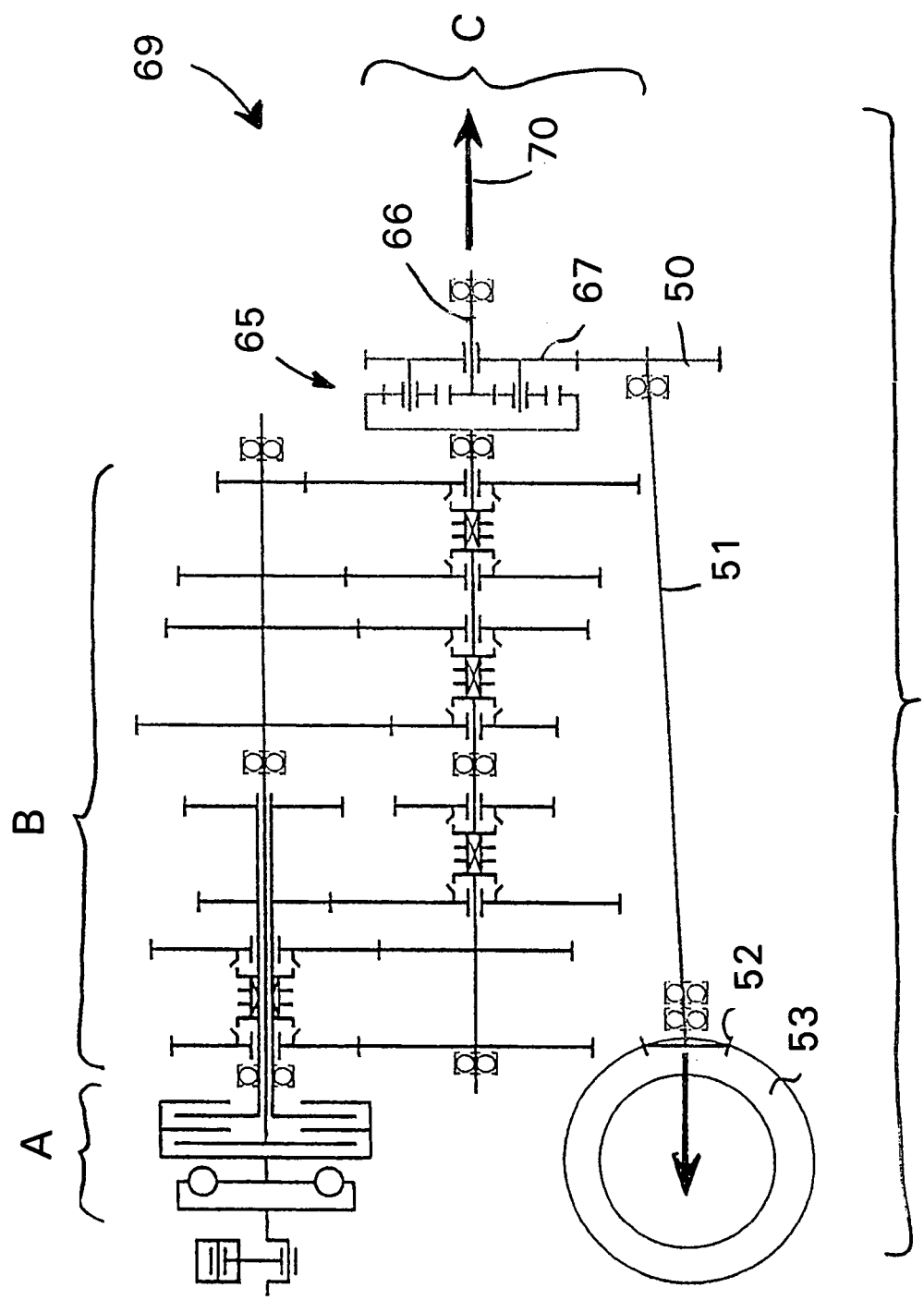
FIG. 9 illustrates an all-wheel variant with axle offset and an integral longitudinal distributor transmission for a front and rear longitudinal power train with front axle differential transmission.
Figure 10:
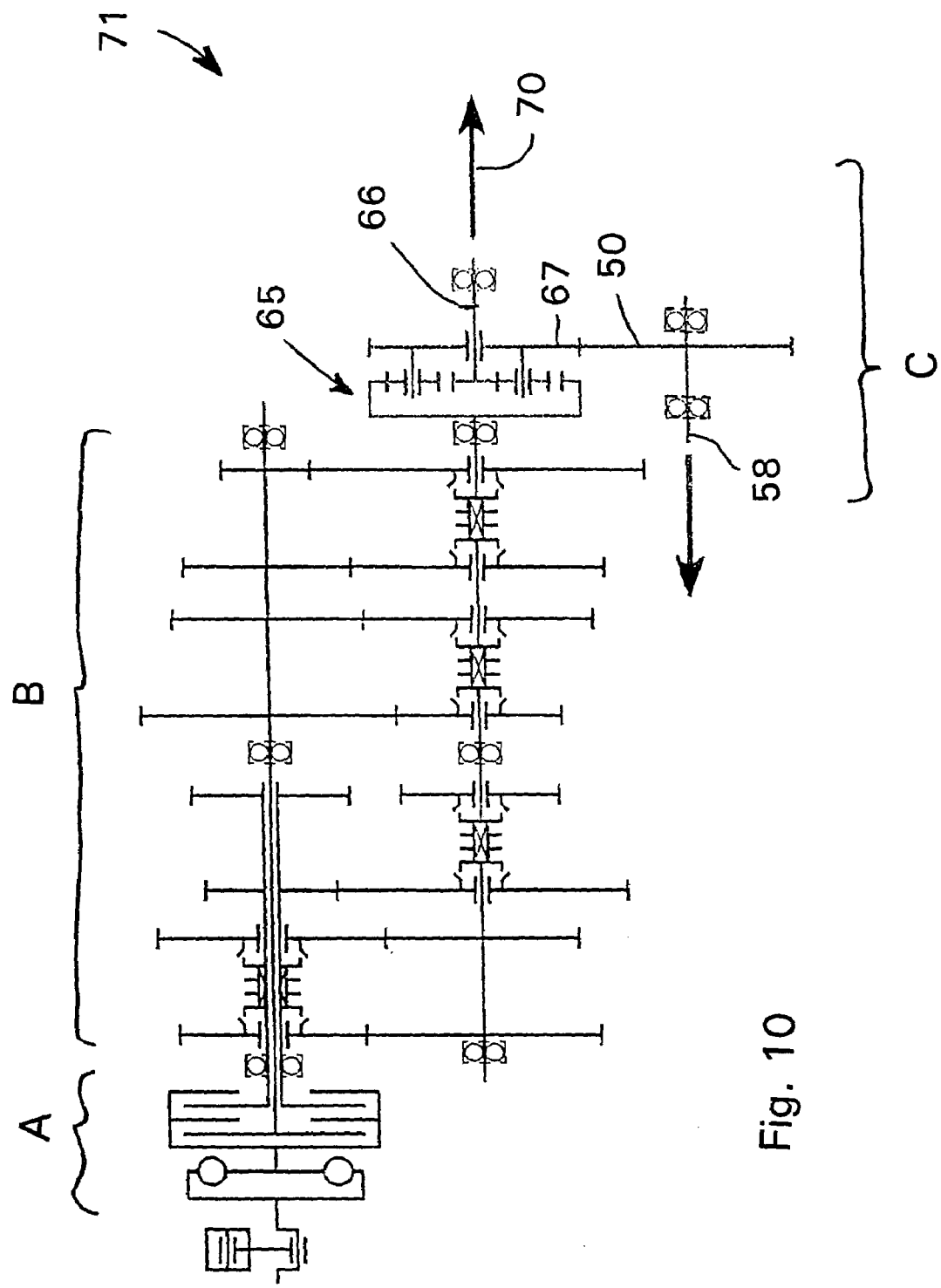
FIG. 10 illustrates a representation as in FIG. 9, but without front axle differential transmission.

FIG. 9 and FIG. 10 show further variants of the all-wheel motor vehicle transmission 64 in accordance with FIG. 7. Motor vehicle transmissions 69, 71 have an axle offset between the two transmission input shafts 6, 7 and the transmission output that points toward the rear axle.

Thus a drive shaft 70 that leads to the rear axle can be fastened to the auxiliary shaft 66 that is connected to the first output of the longitudinal distributor transmission 65, while a second output side (external gearing 67) of the longitudinal distributor transmission 65 is drive-engineering connected to the front axle drive module of the transmission assembly.

The front axle drive module in the output subassembly C is comprised of a fixed gear 50, which is fastened on the obliquely positioned side shaft 51 or on the side shaft 58 that is axially parallel to the transmission output shaft 19 and to the two transmission input shafts 6, 7 and that leads to the front axle differential transmission.

Instead of the longitudinal distributor transmission 65, the output assembly C can also be outfitted with a longitudinal distributor clutch with which a comparatively economical distribution of the drive torque to the front and rear axles is possible.

Figure 11:
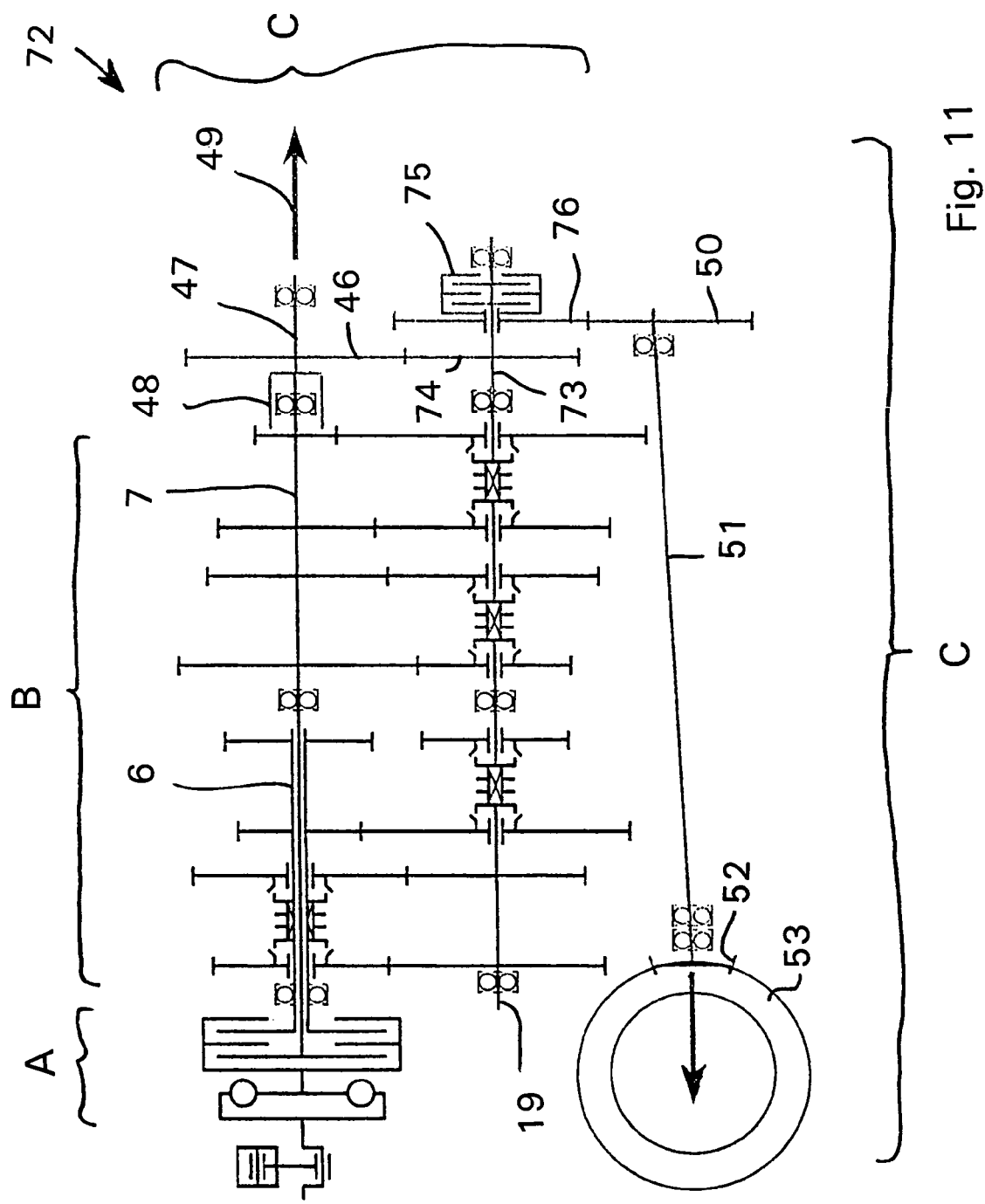
FIG. 11 illustrates an all-wheel variant with an integral longitudinal distributor clutch for a front and rear longitudinal power train with front axle differential transmission.

As FIG. 11 shows, the end of the transmission output shaft 19 that points away from the input side of the core transmission B is connected for this purpose to a first auxiliary shaft 73 of the output subassembly C on which a gear wheel 74 is fastened. The gear wheel 74 drives the already described rear axle drive module, which is comprised of the gear wheel 46 that meshes with the gear wheel 74 and is fastened on the second auxiliary shaft 47, which is constructed as a hollow shaft or has at least one hollow shaft segment 48. The second auxiliary shaft 47, moreover, is pivoted on the free end of the second transmission input shaft 7 and can be connected to the drive shaft 49 that leads to the rear axle transmission.

Above and beyond this, the first auxiliary shaft 73 of the output subassembly C is connected to the input side of the longitudinal distributor clutch 75, whose output side either bears an external gearing or is connected to a gear wheel 76 that is pivoted on the first auxiliary shaft 73. The gear wheel 76 or this external gearing meshes with the gear wheel 50 of the front axle drive module, which, in a transmission 72 in accordance with FIG. 11, is comprised of the obliquely positioned side shaft 51 and the fixed gear 52 fastened thereupon, wherein the latter meshes with the spur bevel gear 53 of a front axle differential transmission that is incorporated into the transmission housing.

Figure 12:
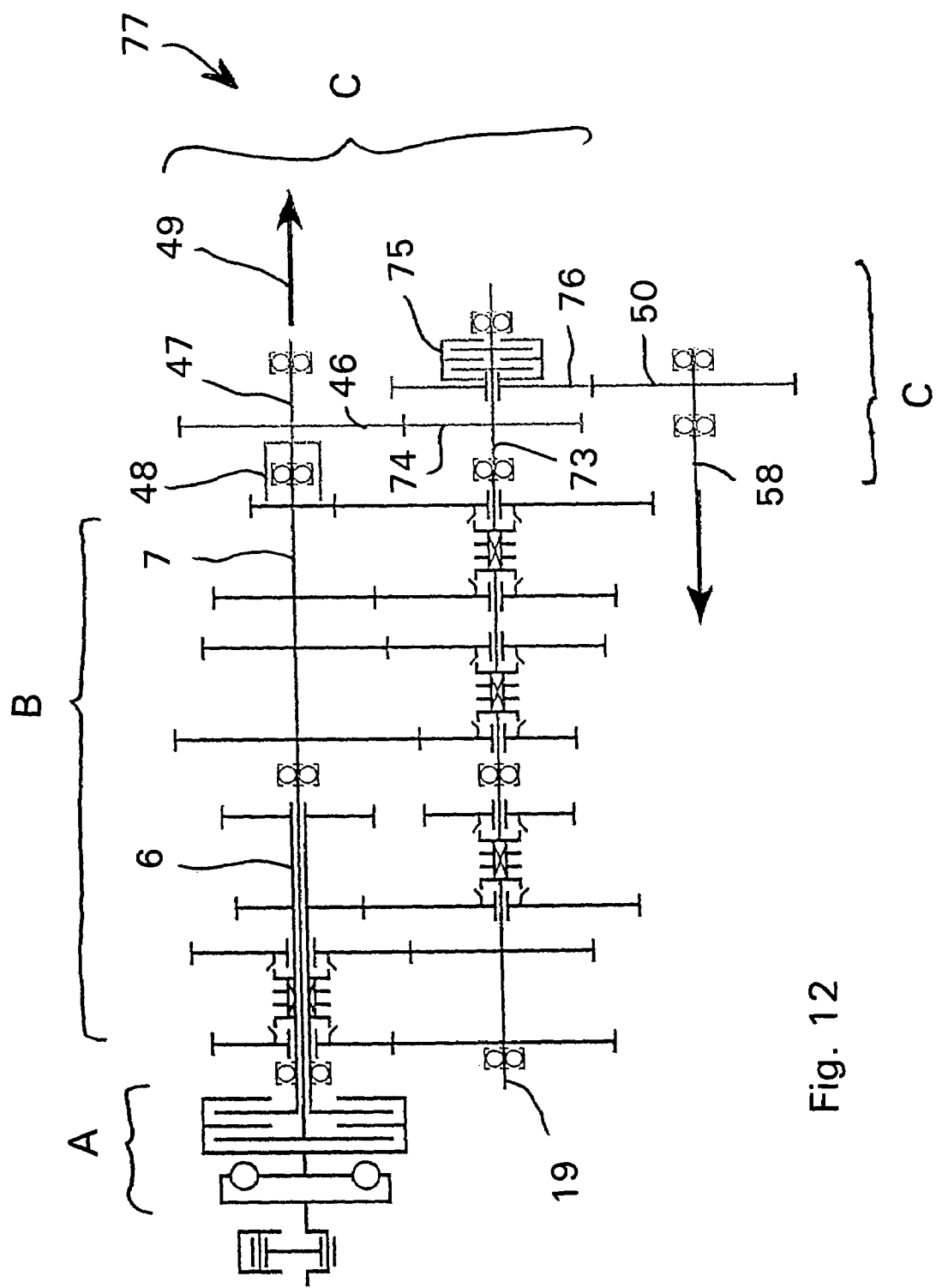
FIG. 12 illustrates a representation as in FIG. 11, but without front axle differential transmission.

A motor vehicle transmission 77 in accordance with FIG. 12 differs from the transmission in accordance with FIG. 11 in that the front axle drive module here is comprised of the side shaft 58, which is arranged axially parallel to the transmission output shaft 19 and toward the two transmission input shafts 6, 7, and thus leads to the front axle differential transmission.

To realize a motor vehicle transmission 78 with a longitudinal distributor clutch 83 and an axle offset between the two transmission input shafts 6, 7 and the output to the rear axle, the transmission of the invention is constructed such that the transmission output shaft 19 is drive-engineering connected to the auxiliary shaft 73 of an output subassembly C, which stands in drive-engineering connection with the input side of a longitudinal distributor clutch 75 and with the drive shaft 70 that leads to the rear axle transmission.

The output to its front axle takes place just as with the transmission in accordance with FIG. 11, via the external gearing of the output side of the longitudinal distributor transmission 75 or via the gear wheel 76 that is connected to this output side and meshes with the gear wheel 50 of the already described front axle drive module.

Figure 13:
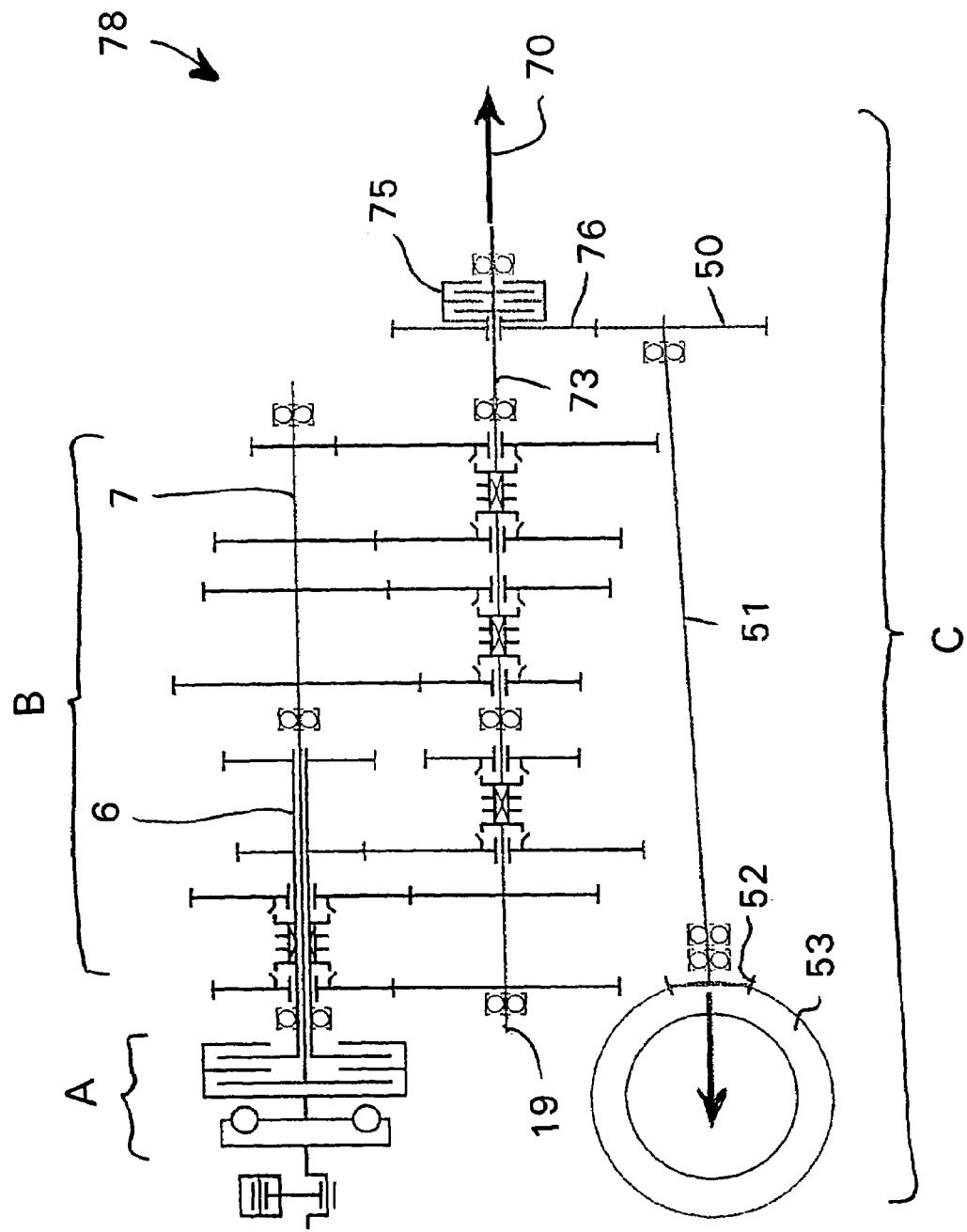
FIG. 13 illustrates an all-wheel variant with axle offset and an integral longitudinal distributor clutch for a front and longitudinal power train with front axle differential transmission.
Figure 14:
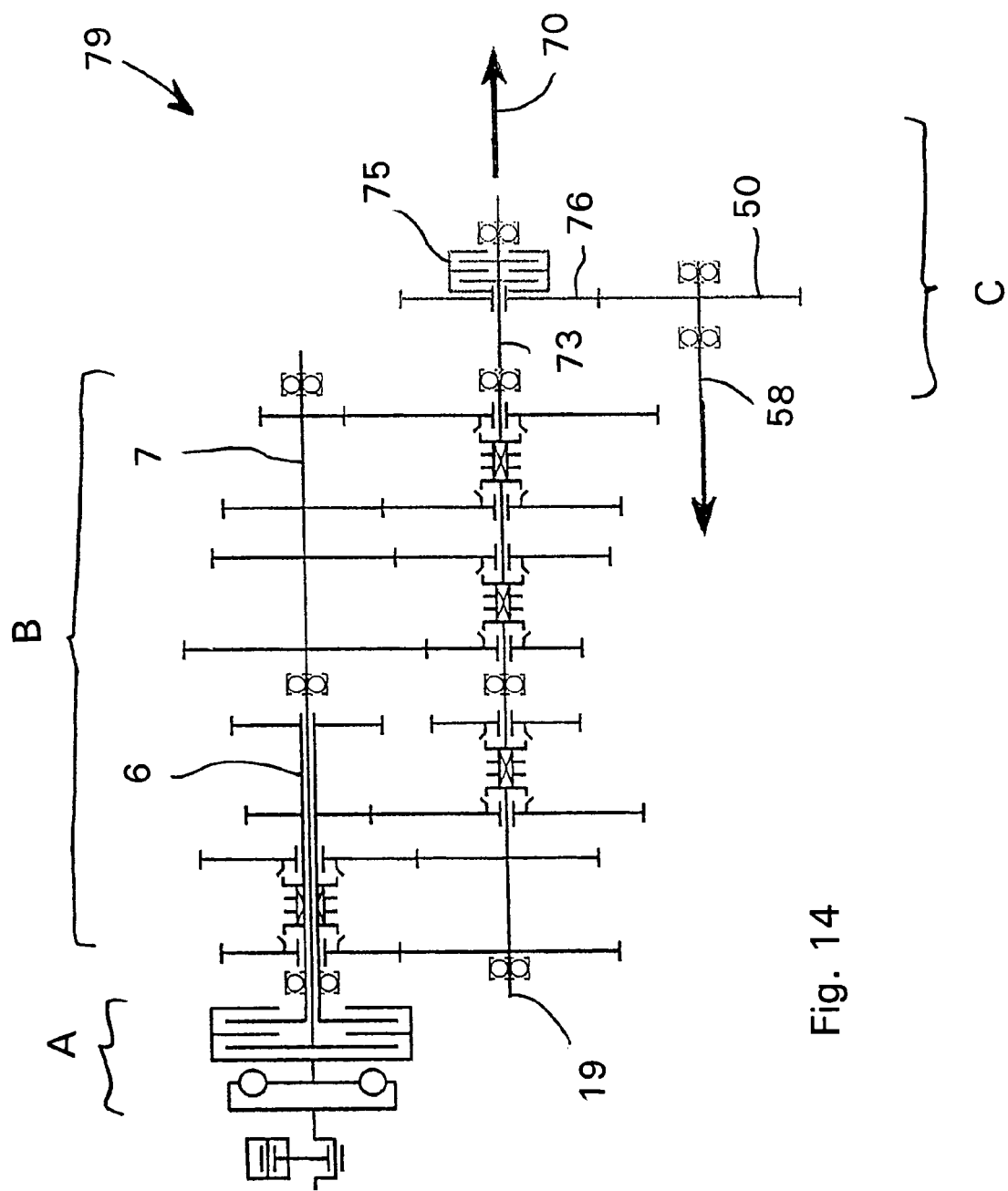
FIG. 14 illustrates an all-wheel variant with an integral longitudinal distributor clutch and axle offset.

With the transmission in accordance with FIG. 13, this module comprises the obliquely positioned side shaft 51 with the fixed gear 52 and the spur bevel gear 53 of the front axle differential transmission, while with the variant of a motor vehicle transmission 79 in accordance with FIG. 14, the side shaft 58 that is axially parallel in relation to the transmission output shaft 19 and to the two transmission input shafts 6, 7 is incorporated.

Figure 15:
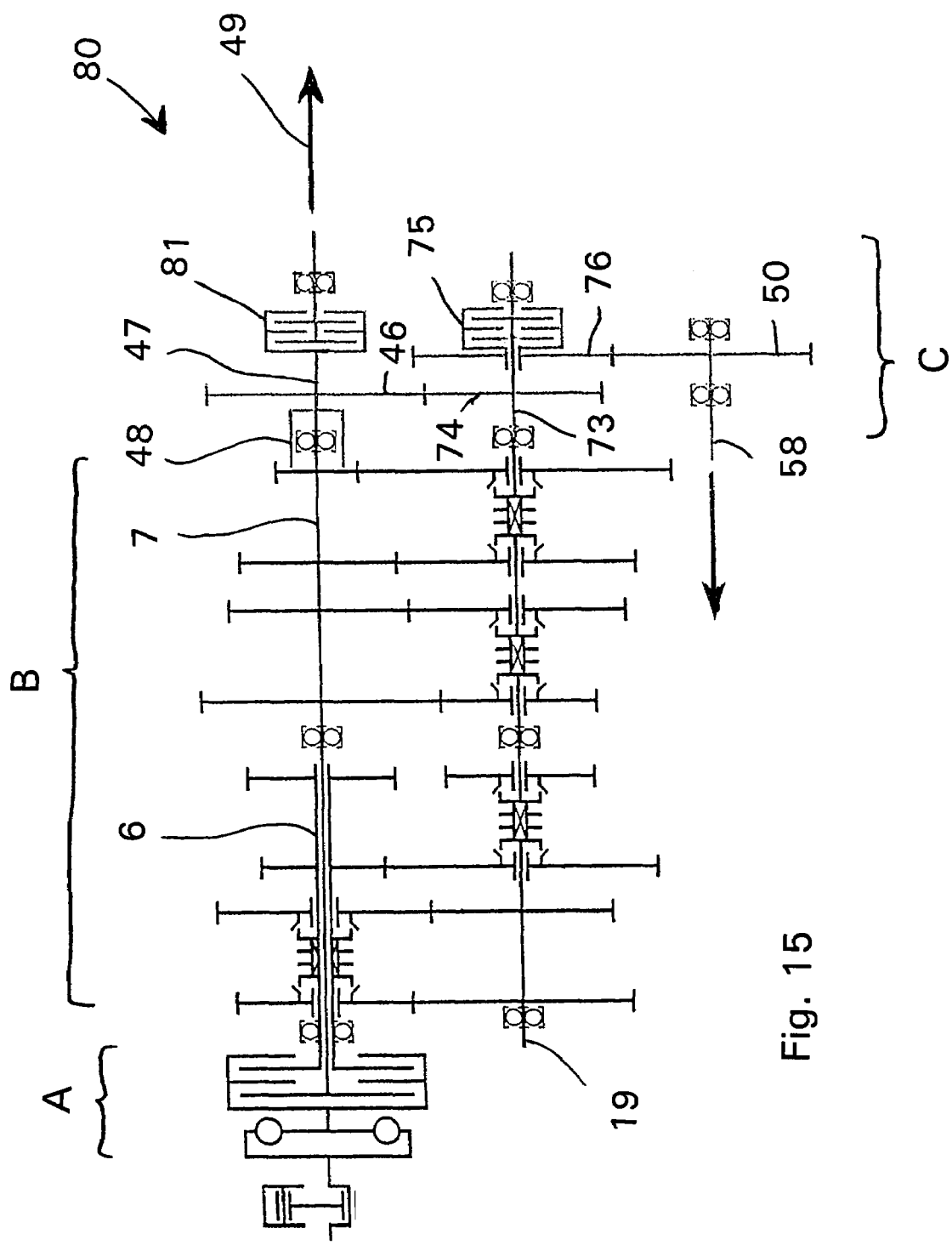
FIG. 15 illustrates an all-wheel variant with two integral longitudinal distributor clutches.

To the extent that a motor vehicle transmission 80 is required in which both the power train to the rear wheels and the power train to the front wheels should be completely separated from the transmission when required, the core transmission B can be connected with two separate longitudinal distributor clutches 75, 81 of an output subassembly C, as represented in FIG. 15.

With the transmission 80, the transmission output shaft 19 is drive-engineering connected to the first auxiliary shaft 73 as with the transmission 79 in accordance with FIG. 14, which also drives the input side of the first longitudinal distributor clutch 75. The first longitudinal distributor clutch 75, as already described, has an external gearing or is connected to the gear wheel 76 that is pivoted on the first auxiliary shaft 73.

If this first longitudinal distributor clutch 75 is closed, the gear wheel 76 drives the gear wheel 50 of the side shaft 58, which is arranged axially parallel to the transmission output shaft 19 and to the two transmission input shafts 6, 7 in the transmission housing, and leads to a front axle differential transmission.

Figure 16:
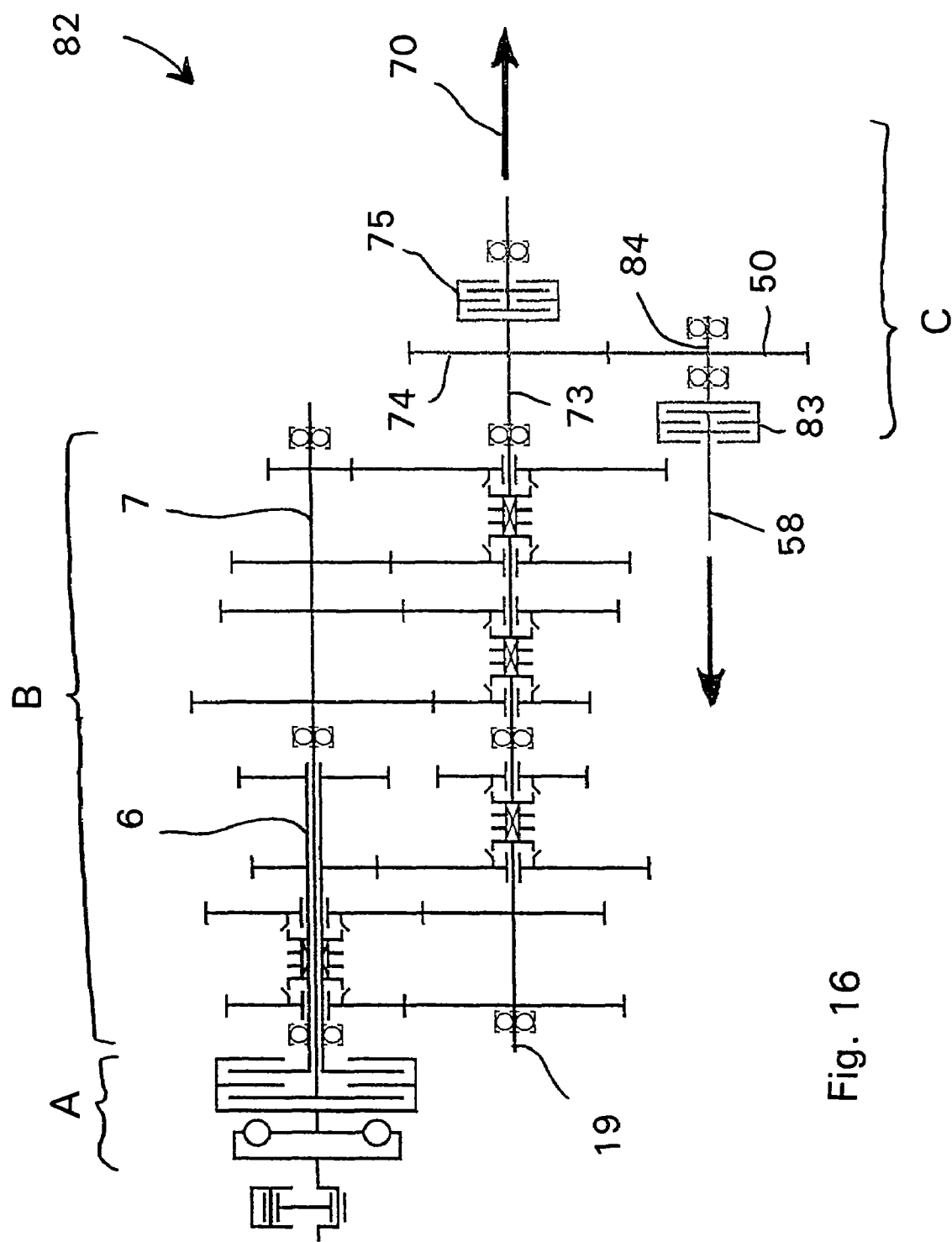
FIG. 16 illustrates an all-wheel variant with two integral longitudinal distributor clutches and axle offset.

An all-wheel motor vehicle transmission 82 with two longitudinal distributor clutches 75, 83 and an axle offset between the transmission input side and the drive shaft 70 that drives to the rear axle can be attained in that the double clutch core transmission B in accordance with FIG. 16 is drive-engineering connected to the auxiliary shaft 73 of output subassembly C on its transmission output shaft 19, which drives the input side of the first longitudinal distributor clutch 75. The output side of this first longitudinal distributor clutch 75 can be connected to the drive shaft 70, which has already been described several times, to drive the rear axle transmission (not shown).

In addition, here again the auxiliary shaft 73 is connected to the gear wheel 74, which meshes with the gear wheel 50, which is fastened on a second auxiliary shaft 84. The second auxiliary shaft 84 is moreover drive-engineering connected with the input side of a second longitudinal distributor clutch 83, so that when the second longitudinal clutch 83 is closed, the side shaft 58 that leads to the front axle differential transmission is driven. In the embodiment of the invention shown in FIG. 16, the side shaft 58 is arranged axially parallel to the transmission output shaft 19 and to the two transmission input shafts 6, 7 in the transmission housing.

Figure 17:
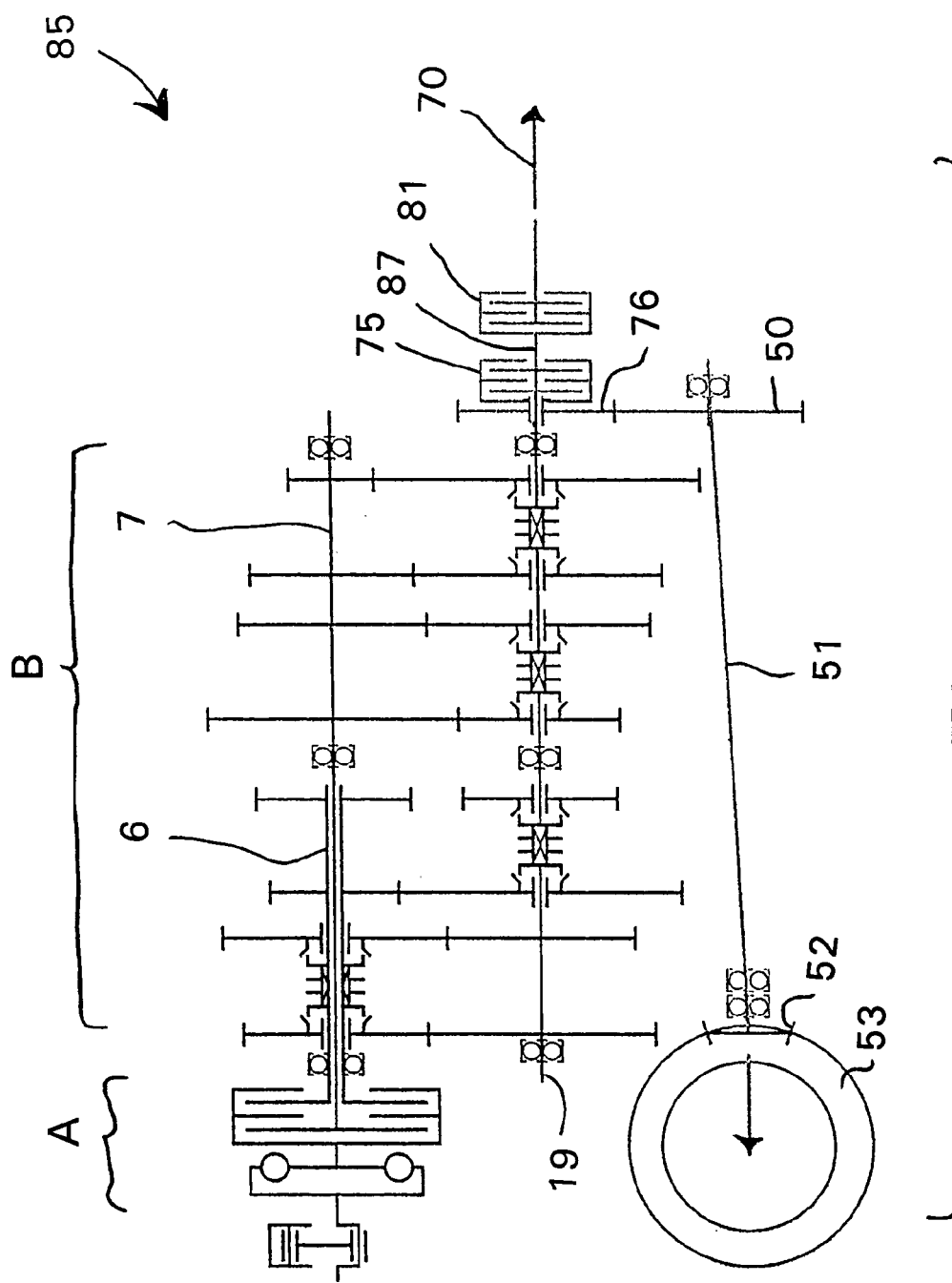
FIG. 17 illustrates an all-wheel variant with two integral longitudinal distributor clutches and integral front axle differential transmission.

As FIG. 17 shows, an all-wheel motor vehicle transmission 85 for longitudinal incorporation into the motor vehicle can also be assembled with the modular construction of the invention using the core transmission B, in which two longitudinal distributor clutches arranged, one behind the other, axially are present in the output subassembly C. Accordingly, the transmission output shaft 19 is connected to the input side of a first and a second longitudinal distributor clutch 75, 81, which are arranged one behind the other axially.

The first longitudinal distributor clutch 75, as with the motor vehicle transmission in accordance with FIG. 13, has an external gearing or a gear wheel 76 that is connected to the input side of the first longitudinal distributor clutch 75 and that meshes with the fixed gear 50 on the obliquely positioned side shaft 51 of the front axle drive module. Moreover, this side shaft 51 bears the fixed gear 52 on its end that points toward the front, which gear meshes with the spur bevel gear 53 of the front axle differential transmission that is incorporated into the transmission housing.

Furthermore, the output side of the second longitudinal distributor clutch 81 is connected to the drive shaft 70 that leads to the rear axle differential transmission.

Figure 18:
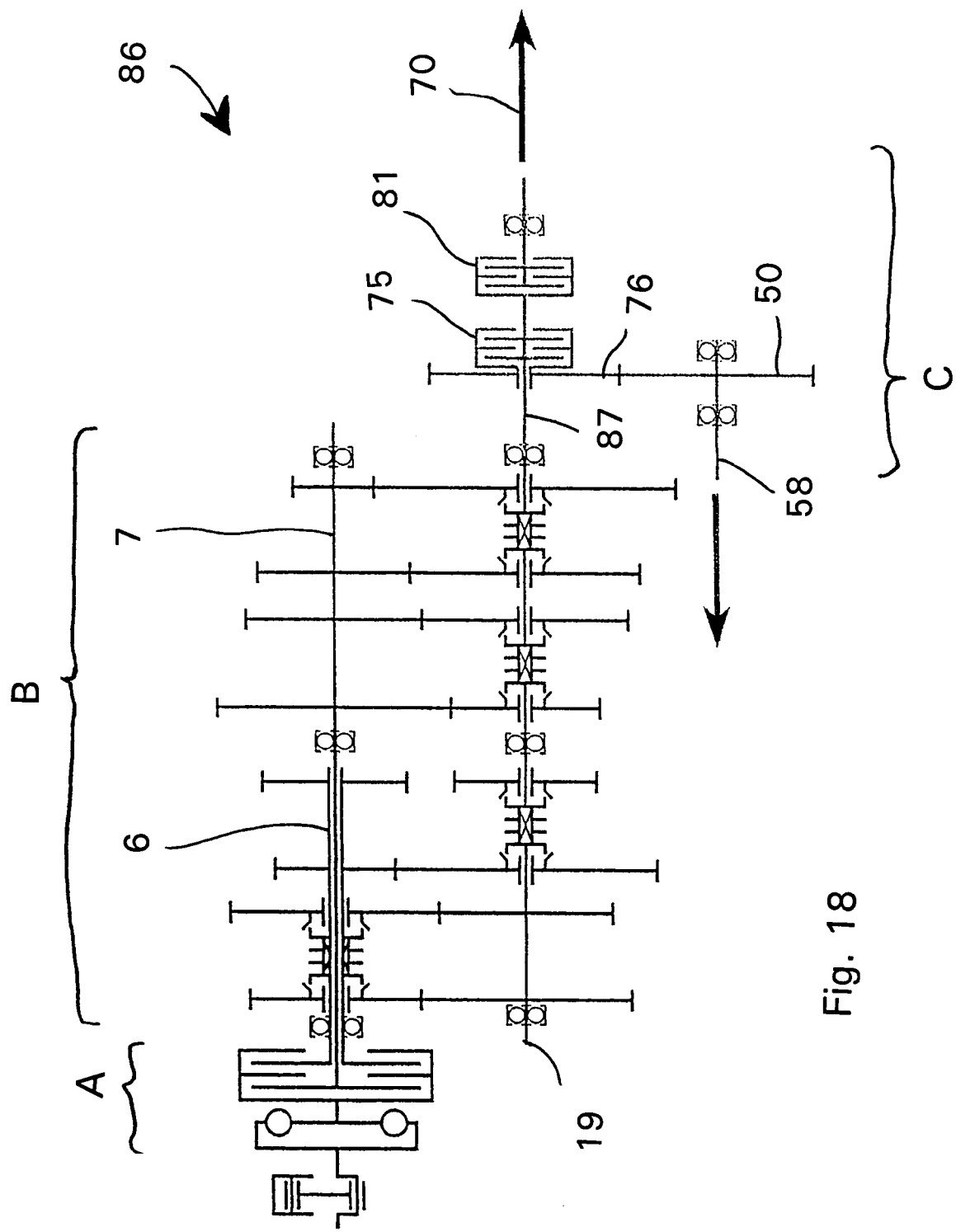
FIG. 18 illustrates an all-wheel variant with two integral longitudinal distributor clutches and axle offset.

FIG. 18 shows a transmission variant 86 of the transmission in accordance with FIG. 17 in which, in the output subassembly C, the side shaft 58 that is axially parallel to the transmission output shaft 19, instead of the obliquely positioned side shaft, is arranged in the transmission housing which, in the front axle drive module described, leads to a separate differential transmission for the front axle of the motor vehicle.

Figure 19:
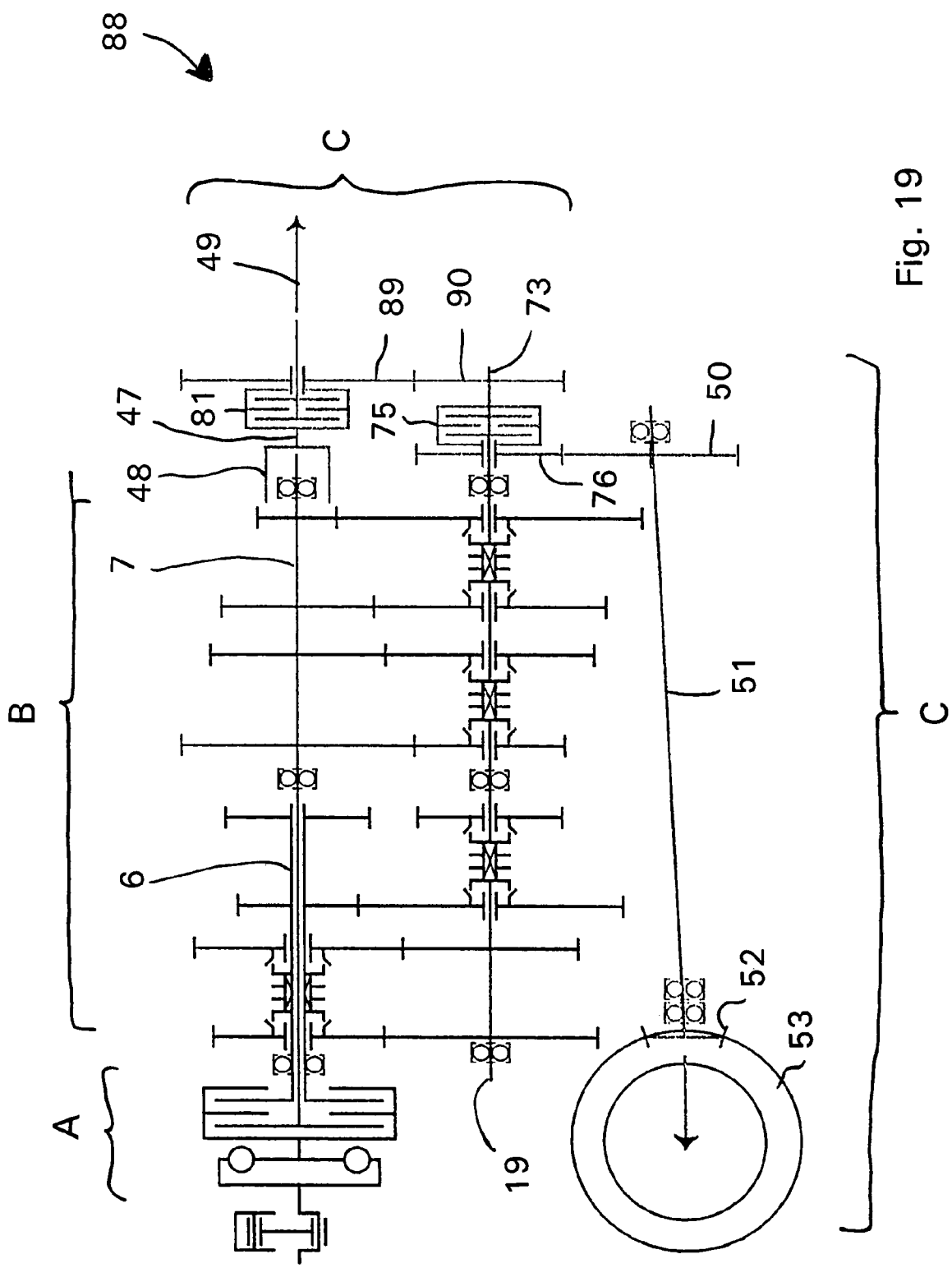
FIG. 19 illustrates an all-wheel variant with two integral longitudinal distributor clutches, axle offset and integral front axle differential transmission.

As can be gathered from FIG. 19, the all-wheel motor vehicle transmission 86, having two longitudinal distributor clutches and an integral front axle differential transmission, can also be constructed using the core transmission B, wherein the side shaft 51 that is incorporated into the output subassembly and leads to the front axle differential transmission is relatively short in comparison with the side shaft 58 of the similar transmission variant 80 in accordance with FIG. 15.

In a motor vehicle transmission 88, the transmission output shaft 19 is connected to the first intermediate shaft 73, which drives the input side of the first longitudinal distributor clutch 75 and moreover bears a fixed gear 90. The fixed gear 90 meshes with an external gearing on the input side of the second longitudinal distributor clutch 81 or with an idler gear 89, which is connected to the input side of this second longitudinal distributor clutch 81 and is pivoted on the second auxiliary shaft 47.

The second auxiliary shaft 47 belongs to the rear axle drive module, in which the auxiliary shaft 47 is constructed as a hollow shaft or has at least one hollow shaft segment 48, and is mounted on the free end of the second transmission input shaft 7.

The output side of this second longitudinal distributor transmission 81 is connected to the drive shaft 49 for rear axle transmission drive, so that the motor vehicle transmission 88 can be completely decoupled from the rear wheels that otherwise drive into the transmission 88, for example, for cross country driving or in drive-less pushing operation phases.

The first longitudinal distributor clutch 75, whose output side is, likewise, connected with an external gearing or with the gearwheel 76 that is pivoted on the first auxiliary shaft 73, offers the same advantage. The gear wheel 76 meshes with the gear wheel 50 of the front axle drive module already described with the other transmission variants, so that this all-wheel power train can also be turned on and off, for example, as a function of cross country driving conditions. Moreover, it is also provided with this power train that the front axle differential can be accommodated in the transmission housing of the motor vehicle transmission 88 near the double clutch 5 owing to the oblique positioning of the side shaft 51.

Figure 20:
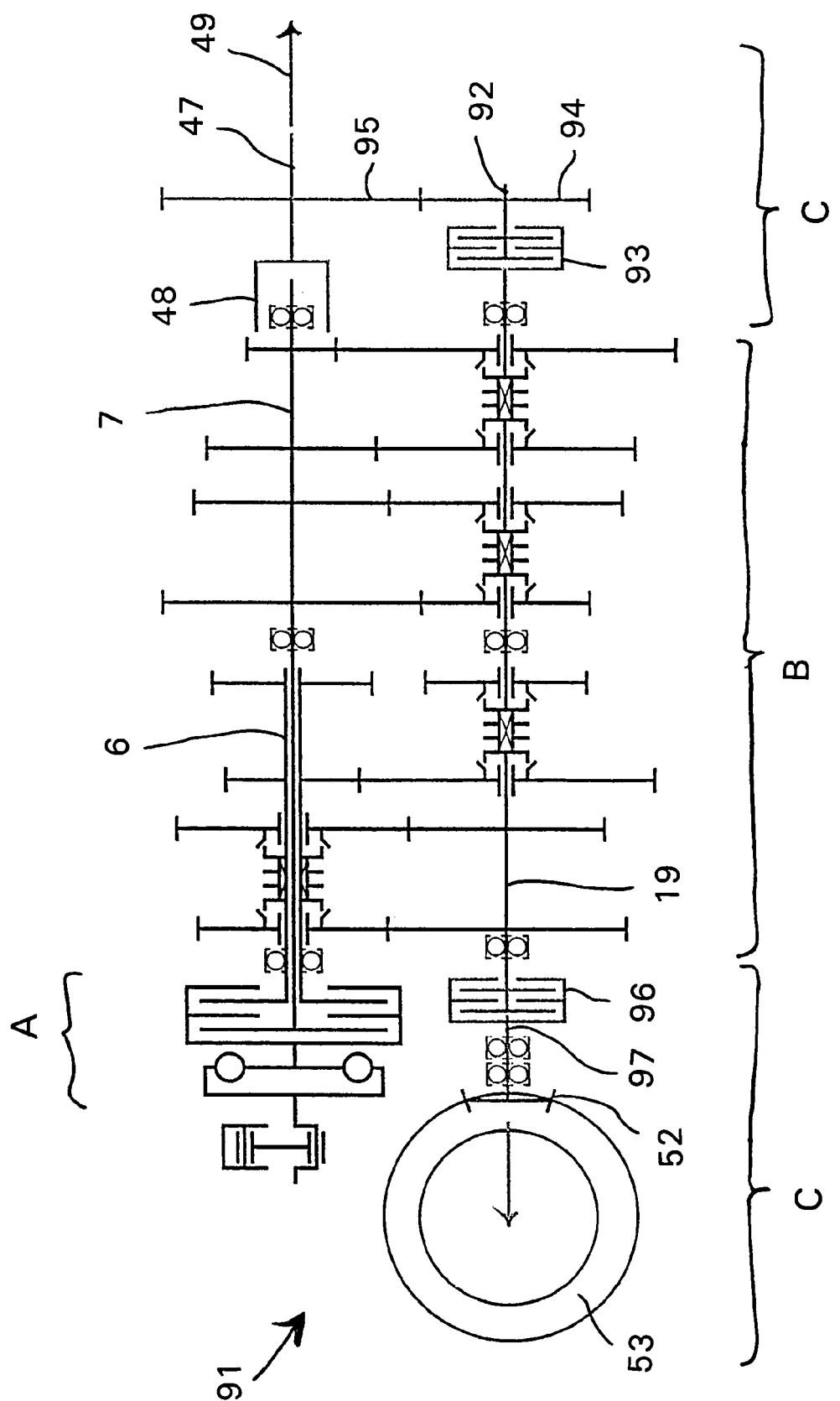
FIG. 20 illustrates an all-wheel variant with two integral longitudinal distributor clutches, integral front axle differential transmission in a slender variant.

Particularly low diameter all-wheel motor vehicle transmission variants, which can be constructed using the core transmission B of the invention, can be inferred from FIGS. 20 to 23. Thus FIG. 20 shows an all-wheel motor vehicle transmission 91 on whose transmission input proximate and transmission output distant ends in output subassembly C, a longitudinal distributor clutch 93, 96 is arranged, in each case. To provide the rear wheels with drive torque, the transmission-remote side of the transmission output shaft 19 is, therefore, connected to the input side of the first longitudinal distributor clutch 93, whose output side stands in connection with a short auxiliary shaft 92 on which a fixed gear 94 is fastened. The fixed gear 94 meshes with a gear wheel 95, which is arranged, fixed, on the auxiliary shaft 47 of a rear axle drive module. The auxiliary shaft 47 is constructed as a hollow shaft or has at least one hollow shaft segment 48 with which it is mounted on the free end of the second transmission input shaft 7. Moreover, the drive shaft 49, which leads to the rear axle transmission, can be drive-engineering connected to the auxiliary shaft 47.

For driving the front wheels, the side of the transmission output shaft 19 that is near the transmission input is connected to the input side of the second longitudinal distributor clutch 96, whose output side is fastened on a further auxiliary shaft 97. The further auxiliary shaft 97 bears the fixed gear 52, which stands in mesh with the spur bevel gear 53 of the front axle differential transmission.

Figure 21:
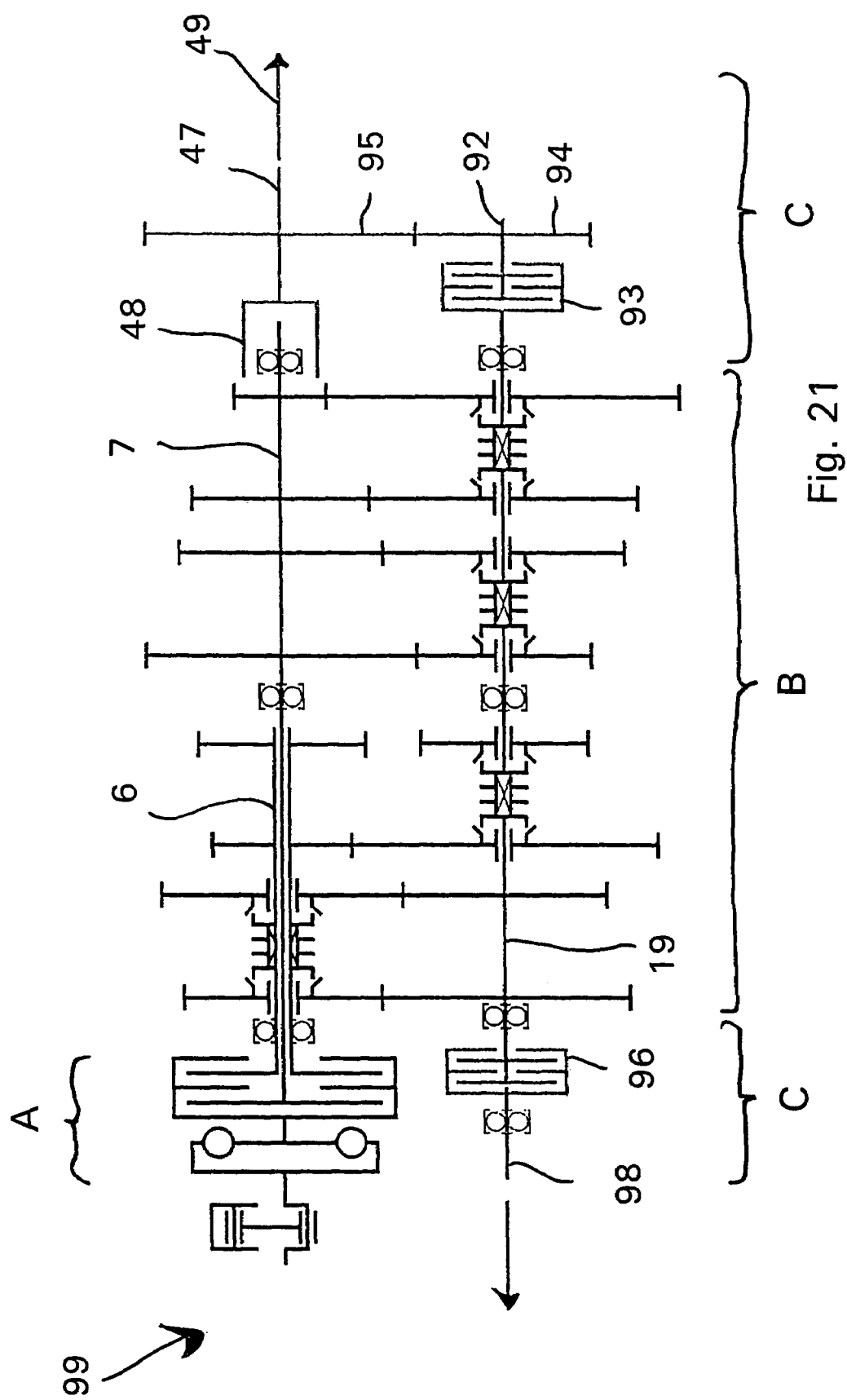
FIG. 21 illustrates an all-wheel variant with two integral longitudinal distributor clutches in a slender variant without front axle differential transmission.

As a modification of the transmission 91, an all-wheel motor vehicle transmission 99 can also be constructed in accordance with FIG. 21 such that, with respect to the transmission components driving the rear axle, the construction is identical to the transmission 91, however, the front axle differential transmission is neither arranged directly nor close to the core components of the motor vehicle transmission. With this construction, a side shaft 98 in an output subassembly C proceeds from the output side of the second longitudinal distributor clutch 96 and leads to the front axle differential transmission.

Figure 22:
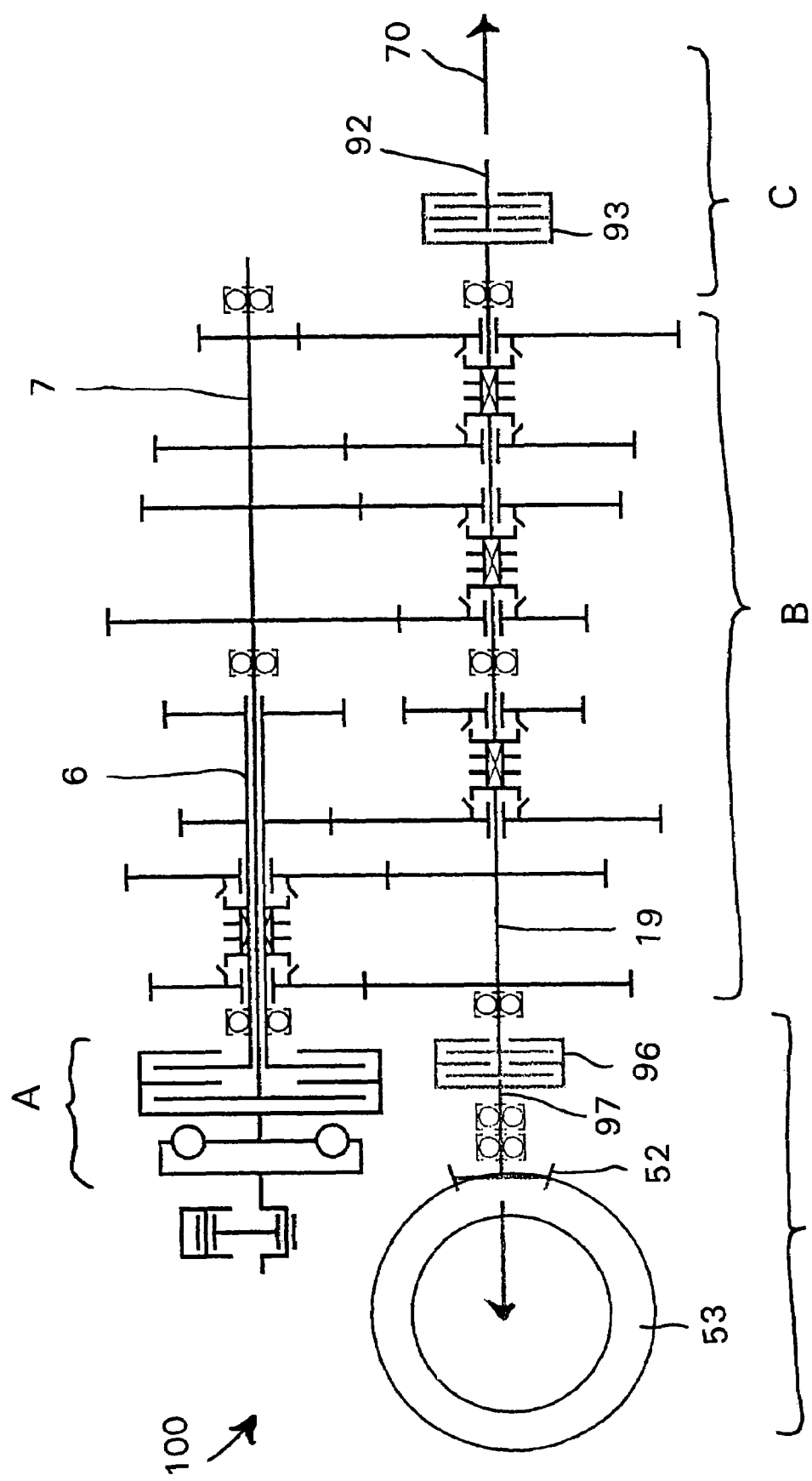
FIG. 22 illustrates an all-wheel variant with two integral longitudinal distributor clutches, axle offset and integral front axle differential transmission in a slender variant.

A further variant of the all-wheel double clutch transmission in accordance with FIG. 20 is illustrated in FIG. 22. While with a motor vehicle transmission 100, the construction of the output subassembly C in the region of the front axle drive is identical to that of the transmission 91 in FIG. 20, the rear axle drive is arranged axially displaced in relation to the input side of the motor vehicle transmission. Therefore, in a further output subassembly C, the output side of the first longitudinal distributor clutch 93, which is connected to the transmission output shaft 19, is coupled with the shaft 92, on which the drive shaft 70 that leads to the rear axle differential transmission is fastened.

Figure 23:
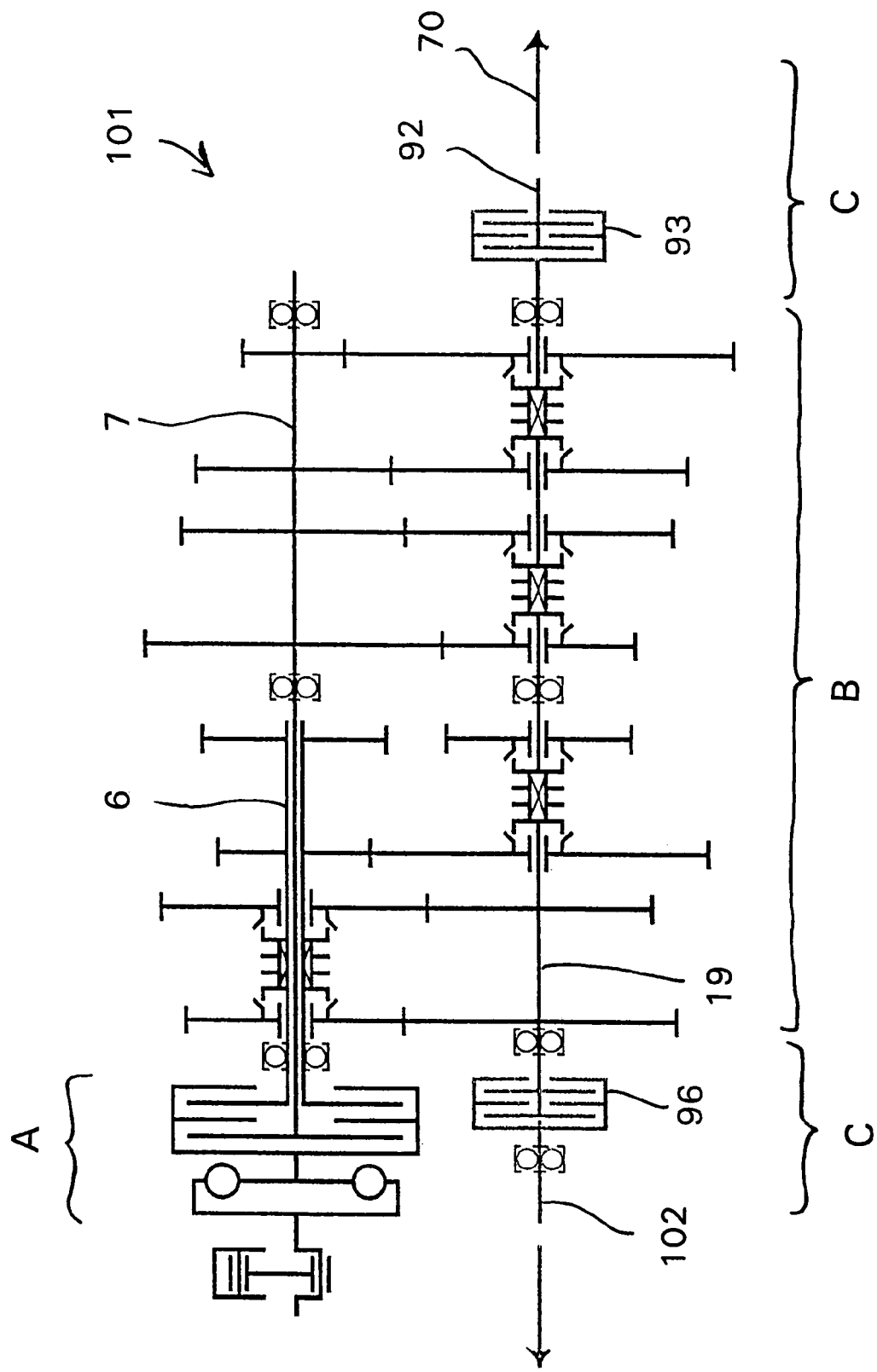
FIG. 23 illustrates an all-wheel variant with two integral longitudinal distributor clutches, axle offset in a slender variant without front axle differential transmission.

The last transmission variant is represented in FIG. 23 in which an all-wheel motor vehicle transmission 101, likewise, has an axle offset between the transmission input side and the rear axle drive. For this, the transmission output shaft 19 is connected to the input side of the first longitudinal distributor clutch 93, at the end of the shaft that points away from the transmission entry, in an output subassembly C, whose output side can be connected to the drive shaft 70 that leads to the rear axle transmission. The input side of the second longitudinal clutch 96 is fastened on the opposite side of the transmission output shaft 19, while the output side stands in connection with a side shaft 102, which leads to a front axle differential transmission that is not represented here.

REFERENCE NUMBERS

1 Motor vehicle transmission
2 Drive motor
3 Crankshaft
4 Torsional vibration damper
5 Double clutch
6 Transmission input shaft; hollow shaft
7 Transmission input shaft
8 Bearing
9 Bearing
10 Bearing
11 Idler gear
12 Idler gear
13 Fixed gear
14 Fixed gear
15 Fixed gear
16 Fixed gear
17 Fixed gear
18 Fixed gear
19 Transmission output shaft
20 Bearing
21 Bearing
22 Bearing
23 Fixed gear
24 Fixed gear
25 Idler gear
26 Idler gear
27 Idler gear
28 Idler gear
29 Idler gear
30 Idler gear
31 Sliding sleeve
32 Sliding sleeve
33 Sliding sleeve
34 Sliding sleeve
35 Adjusting device
36 Adjusting device
37 Adjusting device
38 Adjusting device
39 Drive shaft; Cardan shaft
40 Motor vehicle transmission
41 Auxiliary shaft
42 Output gear wheel
43 Spur bevel gear
44 First auxiliary shaft
45 Fixed gear
46 Fixed gear
47 Second auxiliary shaft
48 Hollow shaft segment 49 Drive shaft; Cardan shaft
50 Fixed gear
51 Side shaft
52 Fixed gear
53 Spur bevel gear
54 Motor vehicle transmission
55 Bearing
56 Bearing
57 Motor vehicle transmission
58 Side shaft
59 Motor vehicle transmission
60 Auxiliary shaft
61 Fixed gear
62 Drive shaft; Cardan shaft
63 Motor vehicle transmission
64 Motor vehicle transmission
65 Longitudinal distributor transmission
66 First auxiliary shafts
67 External gearing of longitudinal distributor transmission
68 Motor vehicle transmission
69 Motor vehicle transmission
70 Drive shaft; Cardan shaft
71 Motor vehicle transmission
72 Motor vehicle transmission
73 First auxiliary shaft
74 Fixed gear
75 Longitudinal distributor clutch
76 Gear wheel
77 Motor vehicle transmission
78 Motor vehicle transmission
79 Motor vehicle transmission
80 Motor vehicle transmission
81 Longitudinal distributor clutch
82 Motor vehicle transmission
83 Longitudinal distributor clutch
84 Auxiliary shaft
85 Motor vehicle transmission
86 Motor vehicle transmission
87 Auxiliary shaft
88 Motor vehicle transmission
89 Gear wheel, external gearing
90 Fixed gear
91 Motor vehicle transmission
92 Auxiliary shaft
93 Longitudinal distributor clutch
94 Fixed gear
95 Fixed gear
96 Longitudinal distributor clutch
97 Auxiliary shaft
98 Auxiliary shaft
99 Motor vehicle transmission
100 Motor vehicle transmission
101 Motor vehicle transmission
102 Auxiliary shaft
A Start-up subassembly
B Core transmission
C Output subassembly

The invention claimed is:

1. A motor vehicle transmission (1) with a start-up subassembly (A), a core transmission (B) and an output subassembly (C) which are connected to one another and jointly arranged in a transmission housing, the start-up subassembly (A) comprises:
   at least one of a clutch,
   a double clutch (5), and
   a torque converter;
   wherein the core transmission (B) comprises a gear reduction transmission which has at least first and second transmission input shafts (6, 7) and a transmission output shaft (19);
   the transmission output shaft (19) is not coaxially oriented with respect to the first and the second transmission input shafts (6, 7); and
   the output subassembly (C) comprises:
      at least one of a plurality of transmission components for one of:
      a front-cross-longitudinal drive (41, 42, 43),
      a front longitudinal and a rear longitudinal drive (39), and
      an all-wheel drive (44, 45, 46, 47, 49, 50, 51, 52, 53, 55, 56); and
   at least one of the first and the second transmission input shafts (6, 7) and the transmission output shaft (19) carries fixed gears, at least one of the first transmission shaft (6) and the transmission output shaft (19) carries both fixed gears (13, 14, 15, 16, 17, 18, 23, 24) and idler gears (11, 12, 25, 26, 27, 28, 29, 30) with each fixed gear mating with a corresponding idler gear to form a meshing gear pair, the idler gears can be connected torsionally-resistant with one of the first transmission shaft (6) and the transmission output shaft (19), via coupling devices (31, 32, 33, 34), and the coupling devices (31, 32, 33, 34) are arranged torsionally-resistant and axially displaceable on the first transmission input shaft (6) and the transmission output shaft (19).

2. The motor vehicle transmission according to claim 1, wherein the start-up subassembly (A), the core transmission (B) and the output subassembly (C) comprise transmission components that are individually assembled to a desired transmission design, and the start-up subassembly (A), the core transmission (B) and the output subassembly (C) comprise component variants ($A_N$, $B_N$, $C_N$), which can be freely combined with one another ($A_1+B_3+C_2$, $A_7+B_5+C_1$ or $A_1+B_5+C_1$).

3. The motor vehicle transmission according to claim 1, wherein the core transmission (B) is comprises one of:
   a manual transmission,
   an automatic gear box,
   an automatic transmission, and
   a manually shiftable or automatically shiftable double clutch transmission with the first and the second transmission input shafts (6, 7).

4. The motor vehicle transmission according to claim 1, wherein gears of the core transmission (B) are sequentially arranged beginning, from an input side of the transmission, in a gear sequence which comprises fourth gear (4'), sixth gear (6'), second gear (2'), reverse gear (R), seventh gear (7'), fifth gear (5'), third gear (3') and first gear (1').

5. The motor vehicle transmission according to claim 4, wherein the gears for the fourth gear (4'), the sixth gear (6'), the second gear (2') and the reverse gear (R) are arranged on the first transmission input shaft (6) located adjacent the start-up subassembly (A) of the transmission, while the gears for the seventh gear (7'), the fifth gear (5'), the third gear (3') and the first gear (1') are arranged on the second transmission input shaft (7).

6. The motor vehicle transmission according to claim 1, wherein the first and the second transmission input shafts (6, 7) are respectively connected, on an input side, to coupling components of the double clutch (5).

7. The motor vehicle transmission according to claim 1, wherein one of the first and the second transmission input shafts (6, 7) is a hollow shaft in which the other of the first and the second transmission input shafts (6, 7) is installed.

8. The motor vehicle transmission according to claim 1, wherein one respective coupling device (31, 32, 33, 34) is located between each pair of idler gears on the first transmission input shaft (6) and on the transmission output shaft (19).

9. The motor vehicle transmission according to claim 8, wherein the coupling devices (31, 32, 33, 34) are sliding sleeves.

10. The motor vehicle transmission according to claim 8, wherein each coupling device (31, 32, 33, 34) is displaced axially along one of the first transmission input shaft (6) and the transmission output shaft (19) by adjusting devices (35, 36, 37, 38).

11. The motor vehicle transmission according to claim 1, wherein the transmission output shaft (19) is arranged in a mounting position of the transmissions in a motor vehicle, one of beneath, above and alongside the first and the second transmission input shafts (6, 7).

12. The motor vehicle transmission according to claim 1, wherein the transmission output shaft (19) is connected to a drive shaft (39, 49, 62, 70) for a rear axle transmission.

13. The motor vehicle transmission according to claim 1, wherein the transmission output shaft (19), on an end that faces toward an input for the first and the second transmission input shafts (6, 7), is connected to an auxiliary shaft (41) and the auxiliary shaft (41) supports a fixed gear (42) that meshes with a spur bevel gear (43) of a front axle differential transmission.

14. The motor vehicle transmission according to claim 1, wherein a fixed gear (45) is arranged on one of an end of the transmission output shaft (19) and on a first auxiliary shaft (44) connected to the transmission output shaft (19), the fixed gear (45) meshes with a fixed gear (46) on a second auxiliary shaft (47), the second auxiliary shaft (47) is a hollow shaft or has a hollow shaft segment (48) and is coaxially mounted to the second transmission input shaft (7), the second auxiliary shaft (47) is connected to a drive shaft (49) for a rear axle transmission, the fixed gear (45) meshes with a further fixed gear (50) fastened to a side shaft (51, 58) for a front axle differential transmission, and the side shaft (51, 58) is oriented one of obliquely, axially parallel to the transmission output shaft (19) and toward an input for the first and the second transmission input shafts (6, 7).

15. The motor vehicle transmission according to claim 1, wherein a fixed gear (61) is arranged on one of the transmission output shaft (19) and on an auxiliary shaft (60) connected with the transmission output shaft (19), the fixed gear (61) meshes with a gearwheel (50) fastened to a side shaft (51, 58) for a front axle differential transmission, the side shaft (51, 58) is positioned one of obliquely and parallel relative to the transmission output shaft (19), and a drive shaft (62), for a rear axle transmission, is fastened to one of the transmission output shaft (19) and the auxiliary shaft (60).

16. The motor vehicle transmission according to claim 1, wherein the transmission output shaft (19) drives a longitudinal distributor transmission (65), a first output (66) supports a fixed gear (45) that meshes with a fixed gear (46) on an auxiliary shaft (47), the auxiliary shaft (47) is a hollow shaft or has a hollow shaft segment (48) coaxially mounted on the second transmission input shaft (7), the auxiliary shaft (47) is connected to a drive shaft (49) for a rear axle drive, and a second output of the longitudinal distributor transmission (65) has an external gearing (67) that meshes with a fixed gear (50) on a side shaft (51, 58) for a front axle differential transmission and oriented one of obliquely and parallel to the transmission output shaft (19) and to the first and second transmission input shafts (6, 7).

17. The motor vehicle transmission according to claim 1, wherein the transmission output shaft (19) drives a longitudinal distributor transmission (65), a first output (66) thereof is connected to a drive shaft (70) for a rear axle transmission, and a second output of the longitudinal distributor transmission (65) supports an external gearing (67) which meshes with a fixed gear (50) on a side shaft (51, 58) for a front axle differential transmission oriented one of obliquely and parallel to the transmission output shaft (19) and to the first and the second transmission input shafts (6, 7).

18. The motor vehicle transmission according to claim 16, wherein the distributor transmission (65) is a Torsen longitudinal distributor transmission.

19. The motor vehicle transmission according to claim 1, wherein a first auxiliary shaft (73) is coaxially fastened to an end of the transmission output shaft (19) that faces away from a transmission input side, the first auxiliary shaft (73) is connected to an input side of a distributor clutch (75), a fixed gear (74) is arranged on the first auxiliary shaft (73) and meshes with a further fixed gear (46) which is arranged torsionally-resistant on a second auxiliary shaft (47), the second auxiliary shaft (47) is one of a hollow shaft or has at least one hollow shaft segment (48) and is mounted on the second transmission input shaft (7), the second auxiliary shaft (47) is connected to a drive shaft (49) for a rear axle transmission, and the distributor clutch (75) has a gearing which meshes with a fixed gear (50) on a side shaft (51, 58) for a front axle differential transmission and oriented one of obliquely and axially parallel to the first transmission output shaft (19) and to the transmission input shafts (6, 7).

20. A motor vehicle transmission (1) with a start-up subassembly (A), a core transmission (B) and an output subassembly (C) which are jointly arranged with one another in a transmission housing, the start-up subassembly (A) comprises:
   at least one of a clutch,
   a double clutch (5), and
   a torque converter;
   wherein the core transmission (B) comprises a gear reduction transmission which has at least first and second transmission input shafts (6, 7) and a transmission output shaft (19);
   the transmission output shaft (19) is not coincident with respect to the first and the second transmission input shafts (6, 7); and
   the output subassembly (C) comprises:
      at least one of a plurality of transmission components for one of:
      a front-cross-longitudinal drive (41, 42, 43),
      a front longitudinal and a rear longitudinal drive (39), and
      an all-wheel drive (44, 45, 46, 47, 49, 50, 51, 52, 53, 55, 56); and
   the first transmission input shaft (6) supports two idler gears (11, 12) and two fixed gears (13, 14) while the second transmission input shaft (7) supports only four fixed gears (15, 16, 17, 18) which are arranged on the second transmission input shaft (7).

21. The motor vehicle transmission according to claim 20, wherein the transmission output shaft (19) supports two fixed gears (23, 24) and six idler gears (25, 26, 27, 28, 29, 30).

22. The motor vehicle transmission according to claim 20, wherein a first auxiliary shaft (73) is coaxially fastened to a side of the transmission output shaft (19) that faces away from an input side of the transmission, a first end of the first auxiliary shaft (73) is connected to an input side of a first distributor clutch (75), an output side of the first distributor clutch (75) drives a gear wheel (76) mounted on the first auxiliary shaft (73), the gear wheel (76) meshes with a fixed gear (50) on a side shaft (51, 58), which leads to a front axle differential transmission and is oriented one of obliquely and parallel to the transmission output shaft (19) and to the transmission input shafts (6, 7), a second gear wheel (74, 90) is fastened to the first auxiliary shaft (73) and meshes with a fixed gear (46, 89) arranged on a second auxiliary shaft (47), the second auxiliary shaft (47) is one of a hollow shaft or has one hollow shaft segment (48) and is mounted coaxially on the second transmission input shaft (7), an end of the second auxiliary shaft (47) that faces away from the transmission input side is connected to an input side of a second distributor clutch (81), and an output side of the second distributor clutch (81) is connected to a drive shaft (49) for a rear axle transmission.

23. The motor vehicle transmission according to claim 20, wherein the transmission output shaft (19) is coaxially connected to a first auxiliary shaft end of the first auxiliary shaft (73), the first auxiliary shaft (73) is connected with an input side of a first distributor clutch (75) whose output side is connected to a drive shaft (70) for a rear axle transmission, a fixed gear (74) is fastened the first auxiliary shaft (73) and meshes with a fixed gear (50) on a second auxiliary shaft (84), the second auxiliary shaft (84) is connected to an input side of a second distributor clutch (83), the output side of the second distributor clutch (83) is connected with a side shaft (51, 58) for a front axle differential transmission and is oriented in one of obliquely and parallel to the transmission output shaft (19) and to the first and the second transmission input shafts (6, 7).

24. The motor vehicle transmission according to claim 20, wherein the transmission output shaft (19) is coaxially connected to an auxiliary shaft (87), on an end thereof that faces away from the transmission output shaft (19), an input side of a first distributor clutch (75) and a second distributor clutch (81) are sequentially arranged, an output side of the second distributor clutch (81) is connected to a drive shaft (70) for rear axle transmission, and an output side of the first distributor clutch (75) drives a gear wheel (76) that meshes with a fixed gear (50) on a side shaft (51, 58) for a front axle differential transmission, the side shaft (51, 58) is oriented one of obliquely and parallel to the first transmission output shaft (19) and to the first and the second transmission input shafts (6, 7).

25. The motor vehicle transmission according to claim 20, wherein a fixed gear (90) on a first auxiliary shaft (73) and an external gearing of an output side of one of a second distributor clutch (81) and the gear wheel (89), connected to the second distributor clutch (81), are arranged on an end of the second transmission input shaft (7) facing away from a transmission input.

26. The motor vehicle transmission according to claim 20, wherein an end of the transmission output shaft (19) that faces away from a transmission input side is connected to an input side of a first distributor clutch (93), whose output side is connected with a first auxiliary shaft (92), a gear wheel (94) is fastened to the first auxiliary shaft (92) and meshes with a fixed gear (95) fastened to a second auxiliary shaft (47), the second auxiliary shaft (47) is one of a hollow shaft or has a hollow shaft segment (48) and is coaxially mounted on the second transmission input shaft (7), the second auxiliary shaft (47) is connected to a drive shaft (49) for a rear axle transmission, an end of the transmission output shaft (19) that faces toward the input side of the transmission is connected to an input side of a second distributor clutch (96) whose output side drives a third auxiliary shaft (97, 98), which either leads to one of a separate front axle differential transmission or supports a fixed gear (52) that meshes with a spur bevel gear (53) of a front axle differential transmission incorporated into the housing of the motor vehicle transmission.

27. The motor vehicle transmission according to claim 20, wherein an end of the transmission output shaft (19) that faces away from an input side of the transmission is connected to an input side of a first distributor clutch (93), whose output side (auxiliary shaft 92) is connected to a drive shaft (70) for a rear axle transmission, and the end of the transmission output shaft (19) that faces toward the input side of the transmission is connected to an input side of a second distributor clutch (96), whose output side is connected with an auxiliary shaft (97) for a front axle differential transmission, upon which shaft a fixed gear (52) is fastened that meshes with a spur bevel gear (53) of the front axle differential transmission.

28. The motor vehicle transmission according to claim 20, wherein an end of the transmission output shaft (19) that faces away from an input side of the transmission is connected to an input side of a first distributor clutch (93), whose output side (92) is connected to a drive shaft (70) for a rear axle transmission, and the end of the transmission output shaft (19) that faces toward the input side of the transmission is connected to an input side of a second distributor clutch (96), whose output side is connected with an auxiliary shaft (102) for a front axle differential transmission.

29. The motor vehicle transmission according to claim 20, wherein one of the transmission components and transmission parts, to be connected to the core transmission, are arranged on or near the first and the second transmission input shafts (6, 7) and the transmission output shaft (19) of the core transmission.

30. A motor vehicle transmission (1) with a start-up subassembly (A), a core transmission (B) and an output subassembly (C) which are connected to one another and jointly arranged in a transmission housing, in which the start-up subassembly (A) comprises:
at least one of a clutch,
a double clutch (5), and
a torque converter;
wherein the core transmission (B) is constructed as a gear reduction transmission which has at least first and second transmission input shafts (6, 7), and a transmission output shaft (19);
the transmission output shaft (19) is not coaxially oriented with respect to the first and the second transmission input shafts (6, 7); and
the output subassembly (C) comprises:
at least one of a plurality of transmission components for one of:
a front-cross-longitudinal drive (41, 42, 43),
a front longitudinal and a rear longitudinal drive (39), and
an all-wheel drive (44, 45, 46, 47, 49, 50, 51, 52, 53, 55, 56); and
the transmission output shaft (19) is coaxially connected to an auxiliary shaft (73), an input side of a longitudinal distributor clutch (75) is arranged on the auxiliary shaft (73), a first output of the longitudinal distributor clutch (75) is connectable to a drive shaft (70) for a rear axle transmission while a second output of the longitudinal distributor clutch (75) drives a gear wheel (76) supported by the auxiliary shaft (73), and the gear wheel (76) meshes with a fixed gear (50) on a side shaft (51) for a front axle differential transmission oriented one of obliquely and parallel to the transmission output shaft (19) and to the first and the second transmission input shafts (6, 7), and the obliquely arranged side shaft (51) supports a fixed gear (52), which meshes with the spur bevel gear (53) of the front axle differential transmission.

* * * * *